(12) United States Patent
Ma et al.

(10) Patent No.: US 9,141,457 B1
(45) Date of Patent: Sep. 22, 2015

(54) SYSTEM AND METHOD FOR PREDICTING MULTIPLE-DISK FAILURES

(71) Applicant: EMC Corporation, Hopkinton, MA (US)

(72) Inventors: Ao Ma, Palo Alto, CA (US); Windsor W. Hsu, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 143 days.

(21) Appl. No.: 14/037,204

(22) Filed: Sep. 25, 2013

(51) Int. Cl.
*G06F 11/00* (2006.01)

(52) U.S. Cl.
CPC ...... *G06F 11/008* (2013.01); *G06F 2211/1073* (2013.01)

(58) Field of Classification Search
CPC ........................ G06F 11/1658–11/1666; G06F 2211/10–2211/1095; G06F 11/1076–11/1096; G06F 11/004; G06F 11/008
See application file for complete search history.

(56) References Cited

U.S. PATENT DOCUMENTS

| | | | | |
|---|---|---|---|---|
| 5,727,144 | A * | 3/1998 | Brady et al. | 714/6.12 |
| 2007/0079170 | A1* | 4/2007 | Zimmer et al. | 714/6 |
| 2011/0276828 | A1* | 11/2011 | Tamaki et al. | 714/26 |

OTHER PUBLICATIONS

Anderson, D. et al., "More than an interface—SCSI vs. ATA," Proceedings of the 2nd Annual Conference on File and storage Technology (FAST), Mar. 2003.
Bairavasundaram, L. N. et al., "An Analysis of Latent Sector Errors in Disk Drives," Proceedings of SIGMETRICS'07, Jun. 2007.
Bairavasundaram, L. N. et al., "An Analysis of Data Corruption in the Storage Stack," Proceedings of the 6th USENIX Conference on File and Storage Technologies (FAST '08), Feb. 2008.
Bodik, P. et al., "Fingerprinting the Datacenter: Automated Classification of Performance Crises," In Proceedings of EuroSys' 10, 2010.
Corbett, P. et al., "Row-Diagonal Parity for Double Disk Failure Correction," Proceedings of the Third USENIX Conference on File and Storage Technologies (FAST '04), Mar. 2004.
Elerath, J. G. et al., "Disk Drive Reliability Case Study: Dependence Upon Head Fly-Height and Quantity of Heads," 2003 Proceedings Annual Reliability and Maintainability Symposium (RAMS '03), Jan. 2003.
Elerath, J. G. et al., "Server Class Disk Drives: How Reliable Are They?" 2004 Proceedings Annual Reliability and Maintainability Symposium (RAMS '04), Jan. 2004.
Elerath, Jon "Hard-Disk Drives: The Good, the Bad, and the Ugly," Communications of the ACM, 52(6), Jun. 2009.

(Continued)

*Primary Examiner* — Jason Bryan
(74) *Attorney, Agent, or Firm* — Blakely, Sokoloff, Taylor & Zafman LLP

(57) ABSTRACT

Techniques for predicting multiple disk failures are described herein. According to one embodiment, first values of a predetermined diagnostic parameter collected from a set of known failed disks of a storage system are received. A quantile distribution graph of the first values against percentiles of a number of known failed disk is generated. In response to second values of the predetermined diagnostic parameter collected from a set of target disks, each of the second values is applied to the quantile distribution graph to determine a corresponding percentile for each of the target disks, which represents a failure probability of a corresponding one of the target disks. A failure probability of two or more of the target disks is calculated based on the determined percentiles of the target disks.

21 Claims, 11 Drawing Sheets

(56) References Cited

OTHER PUBLICATIONS

Goldszmidt, Moises "Finding soon-to-fail disks in a haystack," In Workshop on Hot Topics in Storage and file Systems (HotStorage 12), Jun. 2012.

Gray, J. et al., "Empirical Measurements of Disk Failure Rates and Error Rates," Microsoft Research Technical Report MSR-TR-2005-166, Dec. 2005.

Hamerly, G. et al., "Bayesian approaches to failure prediction for disk drives," Proceedings of the Eighteenth International Conference on Machine Learning (ICML '01), 2001.

Hughes, G. F. et al., "Improved Disk-Drive Failure Warnings," IEEE Transactions on Reliability, 51(3), Sep. 2002.

Kari, Hannu H. "Latent Sector Faults and Reliability of Disk Arrays," PhD Thesis, Helsinki University of Technology, Sep. 1997.

Krioukov, A. et al., "Parity Lost and Parity Regained," In Proceedings of the $6^{th}$ USENIX Conference on File and Storage Technologies (FAST '08), Feb. 2008.

Lancaster, L. et al., "Measuring Real World Data Availability," In Proceedings of the LISA 2001 $15^{th}$ Systems Administration Conference, Dec. 2001.

Murray, J. F. et al., "Hard drive failure prediction using non-parametric statistical methods," Proceedings ICANN/ICONIP 2003.

Murray, J. F. et al., "Machine Learning Methods for Predicting Failures in Hard Drives: A Multiple-Instance Application," Journal of Machine Learning Research, vol. 6, 2005.

Patterson, D. et al., "A Case for Redundant Arrays of Inexpensive Disks (RAID)," Proceedings of the 1988 ACM SIGMOD International Conference on Management of Data (SIGMOD '88), Jun. 1988.

Pinheiro, E. et al., "Failure Trends in a Large Disk Drive Population," Proceedings of the $5^{th}$ USENIX Conference on File and Storage Technologies (FAST '07), Feb. 2007.

Prabhakaran, V. et al., "IRON File Systems," In Proceedings of the $20^{th}$ ACM Symposium on Operating Systems Principles (SOSP '05), Oct. 2005.

Schroeder, B. et al., "Disk failures in the real world: What does and MTTF of 1,000,000 hours mean to you?" In Proceedings of the $5^{th}$ USENIX Conference on File and Storage Technologies (FAST '07), Feb. 2007.

Schroeder, B. et al., "Understanding latent sector errors and how to protect against them," In Proceedings of the $8^{th}$ USENIX Conference on File and Storage Technologies (FAST '10), Feb. 2010.

Schwarz, T. et al., "Disk Failure Investigations at the Internet Archive," NASA/IEEE Conference on Mass Storage Systems and Technologies (MSST 2006), May 2006.

Schwarz, T. J. E. et al. "Disk Scrubbing in Large Archival Storage Systems," Proceedings of the $12^{th}$ IEEE/ACM International Symposium on Modeling, Analysis, and Simulation of Computer and Telecommunication Systems (MASCOTS 2004), Oct. 2004.

Shah, S. et al., "Reliability Analysis of Disk Drive Failure Mechanisms," 2005 Proceedings Annual Reliability and Maintainability Symposium (RAMS '05), Jan. 2005.

Talagala, N. et al., "An Analysis of Error Behavior in a Large Storage System," University of Calilfornia, Berkeley, Computer Science Division, Report No. UCB/CSD-99-1042, Feb. 1999.

Wallace, G. et al., "Characteristics of Backup Workloads in Production Systems," In Proceedings of the $10^{th}$ USENIX Conference on File and Storage Technologies (FAST '12), Feb. 2012.

* cited by examiner

| | Disk 1 | Disk 2 | Disk 3 | Disk 4 |
|---|---|---|---|---|
| P(fail) | 0.3 | 0.4 | 0.5 | 0.6 |
| P(work) = 1 - P(fail) | 0.7 | 0.6 | 0.5 | 0.4 |

SYSTEM AND METHOD FOR PREDICTING MULTIPLE-DISK FAILURES

RELATED APPLICATIONS

This application is related to co-pending U.S. patent application Ser. No. 14/037,199 entitled "System and Method for Determining Disk Failure Indicator to Predict Future Disk Failures," filed Sep. 25, 2013, and co-pending U.S. patent application Ser. No. 14/037,202, entitled "System and Method for Predicting Single-Disk Failures," filed Sep. 25, 2013. The disclosure of the above applications is incorporated by reference herein in it entirety.

FIELD OF THE INVENTION

Embodiments of the present invention relate generally to data storage systems. More particularly, embodiments of the invention relate to predicting multiple disk failures.

BACKGROUND

Data storage utilization is continually increasing, causing the proliferation of storage systems in data centers. Monitoring and managing these systems require increasing amounts of human resources. Information technology (IT) organizations often operate reactively, taking action only when systems reach capacity or fail, at which point performance degradation or failure has already occurred. Hard disk failures fall into one of two basic classes: predictable failures and unpredictable failures. Predictable failures result from slow processes such as mechanical wear and gradual degradation of storage surfaces. Monitoring can determine when such failures are becoming more likely. Unpredictable failures happen suddenly and without warning. They range from electronic components becoming defective to a sudden mechanical failure (perhaps due to improper handling).

Self-Monitoring, Analysis and Reporting Technology (S.M.A.R.T., or simply written as SMART) is a monitoring system for computer hard disk drives to detect and report on various indicators of reliability, in the hope of anticipating failures. When a failure is anticipated by S.M.A.R.T., the user may choose to replace the drive to avoid unexpected outage and data loss. The manufacturer may be able to use the S.M.A.R.T. data to discover where faults lie and prevent them from recurring in future drive designs. However, not all of the S.M.A.R.T. attributes can consistently provide reliable indications of possible disk failures. The S.M.A.R.T. attributes tend to vary and they may have different interpretation from one hard disk vendor or configuration to another. There has been a lack of reliable mechanism to determine which of the S.M.A.R.T. attributes to be the best disk failure indicator, as well as the efficient ways to predict single disk failure or multi-disk failures in a redundant array independent disks (RAID) environment.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
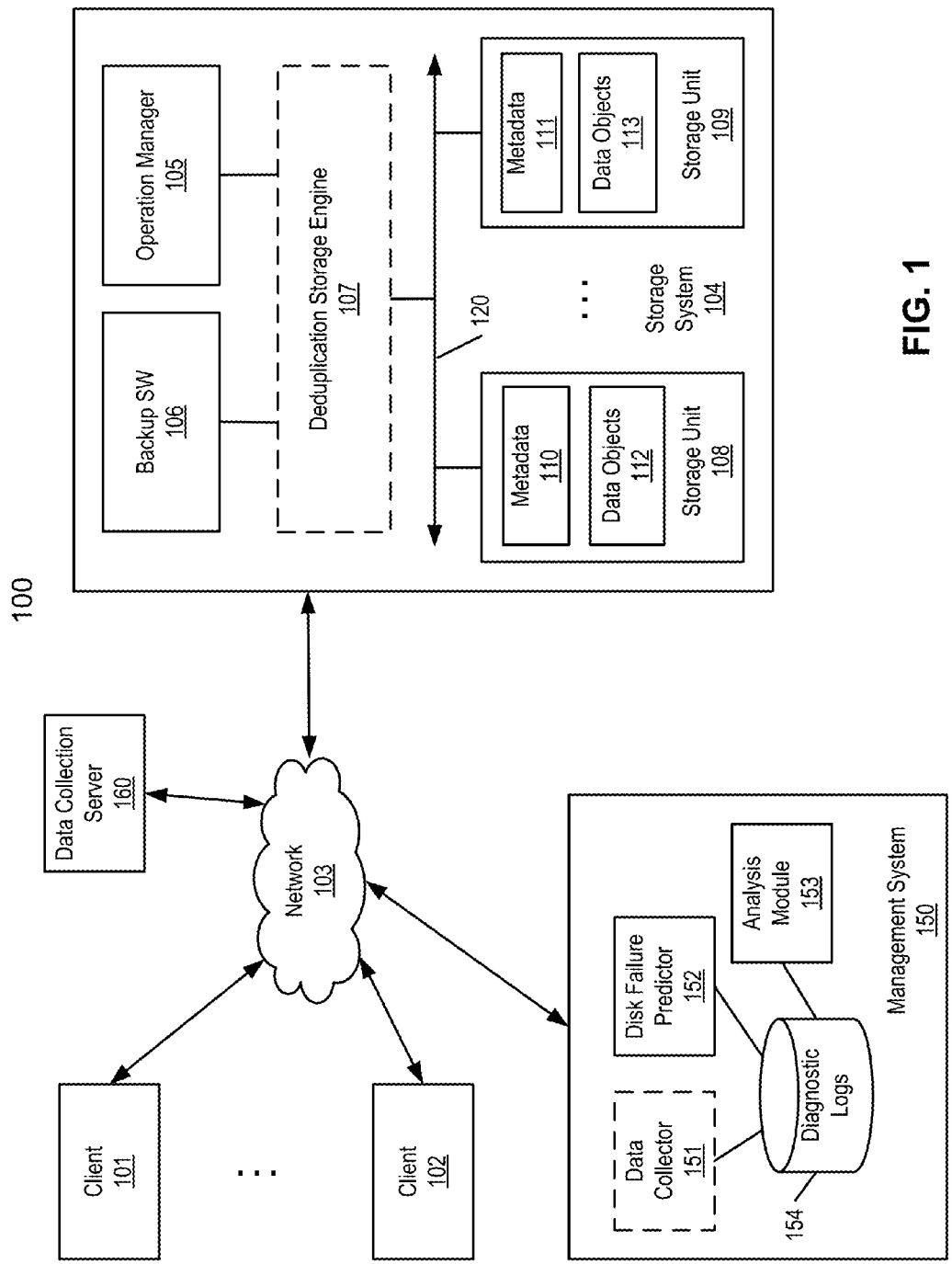
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one aspect of the invention, a method using quantile distribution techniques is provided to select one or more of diagnostic parameters, such as S.M.A.R.T. attributes and/or small computer system interface (SCSI) disk return codes, that are collected from the disks to be the most reliable disk failure indicator or indicators for a given certain storage configuration or environment (e.g., target storage system or disks). According to one embodiment, diagnostic parameters are collected from a set of historically known failed disks and known working disks of a particular storage system or configuration (e.g., a storage system or systems deployed at a particular enterprise or organization). The diagnostic parameters of the known failed disks and known working disks are analyzed or trained in view each other to determine which of the those diagnostic parameters can be used to most efficiently or consistently distinguish or identify a failed disk or working disk from the set of disks.

According to one embodiment, for each of the diagnostic parameters, a first quantile distribution representation and a second quantile distribution representation (e.g., quantile distribution graphs or curves) are generated for the known failed disks and the known work disks, respectively. For each of the diagnostic parameters, the first and second quantile distribution representations are analyzed to determine its maximum difference value between the first and second quantile distribution representations. The maximum difference values of all the diagnostic parameters are then compared to each other to select one or more of the diagnostic parameters that are largest amongst all or above certain predetermined threshold as one or more disk failure indicators, which can consistently identify a potential failed disk from a group of disks.

According to another aspect of the invention, the selected disk failure indicator may be used to predict the disk failure probability of a particular disk. According to one embodiment, values of a predetermined diagnostic parameter (representing the selected disk failure indicator, such as the reallocated sector count as part of S.M.A.R.T. attributes or the medium error as part of SCSI disk return codes) are collected from a set of known failed disks and known working disks associated with a target storage system. A first and second quantile distribution graphs of the values of the predetermined diagnostic parameter for the known failed disks and known working disks are generated, respectively, in view of a range of values of the known failed disks. An optimal threshold of the values of the predetermined diagnostic parameter is determined by comparing the first and second quantile distribution graphs. In one embodiment, the optimal threshold is identified at a position where the difference between the first and second quantile distribution graphs reaches the maximum. The optimal threshold is then utilized to indicate or predict whether a particular target disk may have a higher probability of disk failure, for example, by comparing the value of the predetermined diagnostic obtained from the target disk against the optimal threshold.

According to another aspect of the invention, the selected disk failure indicator may be used to predict the disk failure probability of multiple disks in a RAID configuration. According to one embodiment, values of a predetermined diagnostic parameter (representing the selected disk failure indicator, such as the reallocated sector count as part of S.M.A.R.T. attributes) are collected from a set of known failed disks associated with a target storage system. A quantile distribution graph is generated for the values in view of percentiles (e.g., 10%, 20%, ..., 100%) of a number of known failed disks involved in the quantile distribution. Subsequently, when values of the predetermined diagnostic parameter are collected from a set of target storage disks, the collected values are applied to the quantile distribution graph to determine their respective percentiles of the target disks. Each percentile represents a probability of the corresponding disk failure. The individual disk failure probabilities are then used to calculate the probability of disk failures of two or more of the target disks.

FIG. 1 is a block diagram illustrating a storage system according to one embodiment of the invention. Referring to FIG. 1, system 100 includes, but is not limited to, one or more client systems 101-102 communicatively coupled to one or more storage systems 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, or a combination thereof.

Storage system 104 may include any type of server or cluster of servers. For example, storage system 104 may be a storage server used for any of various different purposes, such as to provide multiple users with access to shared data and/or to back up mission critical data. In one embodiment, storage system 104 includes, but is not limited to, backup engine 106, optional deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network.

In response to a data file to be stored in storage units 108-109, deduplication storage engine 107 is configured to segment the data file into multiple chunks (also referred to as segments) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

According to one embodiment, storage system 104 further includes an operation manager 105 to manage and monitor operations performed by storage system 104, including periodically collecting and transmitting operating diagnostic data to a remote device such as management system 150 over network 103. In this example as shown in FIG. 1, storage system 104 may be located at a client site and utilized by a client such as an enterprise or corporation, where the storage system 104 may be provided by a storage provider or vendor such as EMC® Corporation. In one embodiment, operation manager 105 periodically collects operating statistics concerning operations of storage units 108-109 and transmits diagnostic data representing at least some of the operating statistics to management system 150, where management system 150 is associated with a storage provider or vendor that provides storage system 104 to a client. For example, management system 150 may be operated or owned by the storage provider or alternatively, it may be operated by a third-party vendor on behalf of the storage provider. In one embodiment, the diagnostic data may include diagnostic parameters such as those defined by S.M.A.R.T. specification and/or those defined as part of the SCSI disk return codes, which may be collected from the storage system 104. For example, operation manager 105 may include or communicate with a S.M.A.R.T. tool or software configured to monitor operations of storage units 108-109. Each of the storage units 108-109 may be implemented one or more individual disks or alternatively, a RAID array of disks.

Note that storage system 104 may represent a group or cluster of individual storage systems, where operation manager 105 of each storage system may be equipped with a "phone-home" functionality that may periodically transmit operating status of the respective storage system, including the diagnostic parameters (e.g., S.M.A.R.T. attributes and SCSI return codes) of the associated storage disks, to a centralized or distributed entity, such as management server 150 or dedicated data collection entity 160 (e.g., a third-party data collection agent).

According to one embodiment, management system 150 includes a data collector 151, disk failure predictor 152, and analysis module 153. Data collector 151 is employed to communicate with operation manager 105 of storage system(s) 104 to collect diagnostic data concerning operating statuses of storage units 108-109, as well as storage system 104 in general. Note that although one storage system is shown in FIG. 1, data collector 151 may communicate with multiple operation managers of multiple storage systems to collect diagnostic data concerning the respective storage systems, which may be located at the same or different geographical locations (e.g., same or different client sites). For example, management system 150 may be a centralized management server or cluster of servers (e.g., in the cloud) for single or multiple clients or customers.

The collected diagnostic data is stored in a storage device as part of diagnostic logs 154. In one embodiment, diagnostic data 154 includes diagnostic parameters collected from various storage systems such as storage system 104. The diagnostic parameters may be those attributes (e.g., reallocated sector, pending sector, uncorrectable sector, etc.) defined by S.M.A.R.T. as shown in the Appendix I below. Alternatively, diagnostic parameters may be those from the SCSI return codes (e.g., medium error, timeout, connection error, data error, etc.) as shown in the Appendix II below. In one embodiment, analysis module 153 is to perform an analysis on the diagnostic data 154 such as determining which of the diagnostic parameters can be used as the best disk failure indicator(s). Disk failure predictor 152 is configured to predict, using the disk failure indicator(s), which one or more of the disks of storage units 108-109 of storage system 104 have a higher probability of disk failures.

According to one embodiment of the invention, analysis module 153 utilizes quantile distribution techniques to select one or more of diagnostic parameters, such as S.M.A.R.T. attributes, SCSI return codes, that are collected from the disks of storage units 108-109 to be the most reliable disk failure indicator or indicators for a given certain storage configuration or environment (e.g., target storage system or disks). According to one embodiment, diagnostic parameters are collected, for example, by data collector 151 or server 160, from a set of historically known failed disks and known working disks of a particular storage system or configuration (e.g., a storage system or systems deployed at a particular enterprise or organization). The diagnostic parameters of the known failed disks and known working disks are analyzed or trained by analysis module 153 in view each other to determine which of the those diagnostic parameters can be used to most efficiently or consistently distinguish or identify a failed disk or working disk from the set of disks.

According to one embodiment, for each of the diagnostic parameters, a first quantile distribution representation and a second quantile distribution representation (e.g., quantile distribution graphs or curves) are generated for the known failed disks and the known work disks, respectively. For each of the diagnostic parameters, the first and second quantile distribution representations are analyzed to determine its maximum difference value between the first and second quantile distribution representations. The maximum difference values of all the diagnostic parameters are then compared to each other to select one or more of the diagnostic parameters that are largest amongst all or above certain predetermined threshold as one or more disk failure indicators, which can consistently identify a potential failed disk from a group of disks.

According to another embodiment of the invention, the selected disk failure indicator may be used by disk failure predictor 152 to predict the disk failure probability of a particular disk. According to one embodiment, values of a predetermined diagnostic parameter (representing the selected disk failure indicator, such as the reallocated sector count as part of S.M.A.R.T. attributes) are collected (e.g., by collector 151 or server 160) from a set of known failed disks and known working disks associated with a target storage system. A first and second quantile distribution graphs of the values of the predetermined diagnostic parameter for the known failed disks and known working disks are generated, respectively, in view of a range of values of the known failed disks. An optimal threshold of the value of the predetermined diagnostic parameter is determined by comparing the first and second quantile distribution graphs. In one embodiment, the optimal threshold is identified at a position where the difference between the first and second quantile distribution graphs reaches the maximum. The optimal threshold is then utilized by disk failure predictor 152 to indicate or predict whether a particular target disk may have a higher probability of disk failure, for example, by comparing the value of the predetermined diagnostic obtained from the target disk against the optimal threshold.

According to a further embodiment of the invention, the selected disk failure indicator may be used to predict the disk failure probability of multiple disks in a RAID configuration. According to one embodiment, values of a predetermined diagnostic parameter (representing the selected disk failure indicator, such as the reallocated sector count as part of S.M.A.R.T. attributes) are collected (e.g., by data collector 151 or server 160) from a set of known failed disks associated with a target storage system. A quantile distribution graph is generated (e.g., by analysis module 153 or disk failure predictor 152) for the values in view of percentiles (e.g., 10%, 20%, . . . , 100%) of a number of known failed disks involved in the quantile distribution. Subsequently, when values of the predetermined diagnostic parameter are collected from a set of target storage disks, the collected values are applied (e.g., by disk failure predictor 152) to the quantile distribution graph to determine their respective percentiles of the target disks. Each percentile represents a probability of the corresponding disk failure. The individual disk failure probabilities are then used (e.g., by disk failure predictor 152) to calculate the probability of disk failures of two or more of the target disks.

Figure 2:
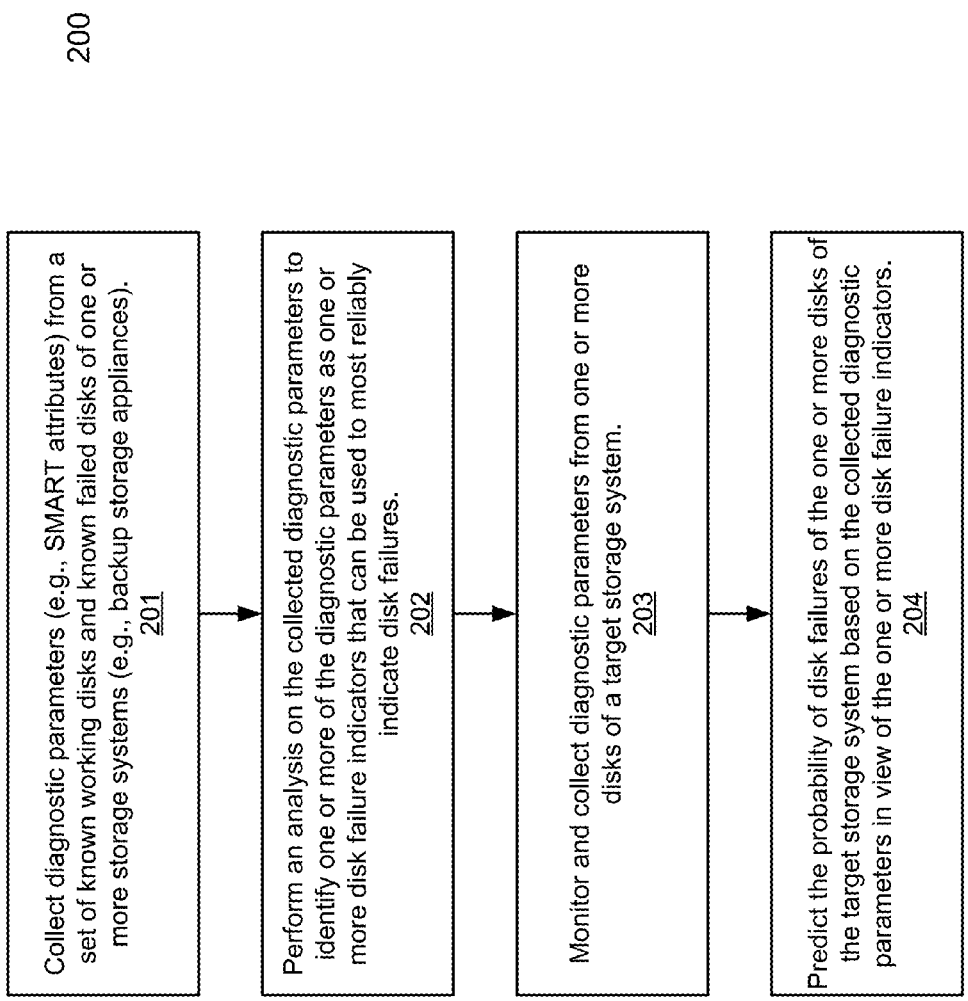
FIG. 2 is a flow diagram illustrating a method for predicting disk failures according to one embodiment of the invention.

FIG. 2 is a flow diagram illustrating a method for predicting disk failures according to one embodiment of the invention. Method 200 may be performed by processing logic which may include software, hardware, or a combination thereof. For example, method 200 may be performed by management system 150 of FIG. 1. Referring to FIG. 2, at block 201, processing logic collects diagnostic parameters (e.g., at least a portion of S.M.A.R.T. attributes) from a set of historically known failed disks and known working disks of one or more storage systems (e.g., deduplicated backup storage systems). At block 202, processing logic performs an analysis on the collected diagnostic parameters to identify one or more of the diagnostic parameters as one or more disk failure indicators that can be used to consistently or reliably indicate future disk failures. In one embodiment, processing logic utilizes quantile distribution techniques to select one or more of the diagnostic parameters as one or more disk failure indicators. At block 203, processing logic monitors and collects diagnostic parameters from one or more target disks of a target storage system. At block 204, processing logic predicts, using the selected disk failure indicator(s), the probability of disk failures of the one or more disks of the target storage system based on the collected diagnostic parameters. The disk failure indicator(s) can be utilized to predict the probability of single-disk configuration or multi-disk configuration such as a RAID configuration.

As described above, a disk failure indicator can be identified and selected from a set of diagnostic parameters, such as the S.M.A.R.T. attributes set forth below in the Appendix I or SCISI return codes set forth below in the Appendix II, collected from a set of known failed disks and working disks, using quantile distribution analysis. Quantiles are points taken at regular intervals from the cumulative distribution function of a random variable. Dividing ordered data into q essentially equal-sized data subsets is the motivation for q-quantiles; the quantiles are the data values marking the boundaries between consecutive subsets. Put another way, the $k^{th}$ q-quantile for a random variable is the value x such that the probability that the random variable will be less than x is at most k/q and the probability that the random variable will be more than x is at most (q−k)/q=1−(k/q). There are q−1 of the q-quantiles, one for each integer k satisfying 0<k<q.

As described above, in order to predict future disk failures, a disk failure indicator that can consistently or reliably indicate future disk failures must be identified. According to one embodiment, certain diagnostic parameters, which may be selected from at least some of the S.M.A.R.T. attributes, are collected from a set of previously known failed disks (e.g., q failed disks) and a set of known working disks (e.g., q working disks). For each of the collected diagnostic parameters, a quantile distribution representation (also referred to as a quantile distribution graph or curve) is generated.

For example, for a set of known working disks (e.g., a predetermined number of working disks), values of a particular diagnostic parameter are collected from the set of working disks (for example, via a diagnostic or monitoring tool such as S.M.A.R.T. tool):

Working Set=[10, 20, 30, 40, 50, 60, 70, 80, 90, 100]

In this example, it is assumed there are 10 disks in each set. The values of the particular diagnostic parameter are stored in an array and sorted according to a predetermined order, in this example, an ascending order, from small to large.

Similarly, values of the same diagnostic parameter are collected from the set of known failed disks:

Failed Set=[10, 50, 100, 150, 200, 250, 300, 350, 400, 450]

Similar to the working set, the values of the same diagnostic parameter for the failed disks are stored in an array and sorted according to the same order as the working set (e.g., ascending order).

Figure 3A:
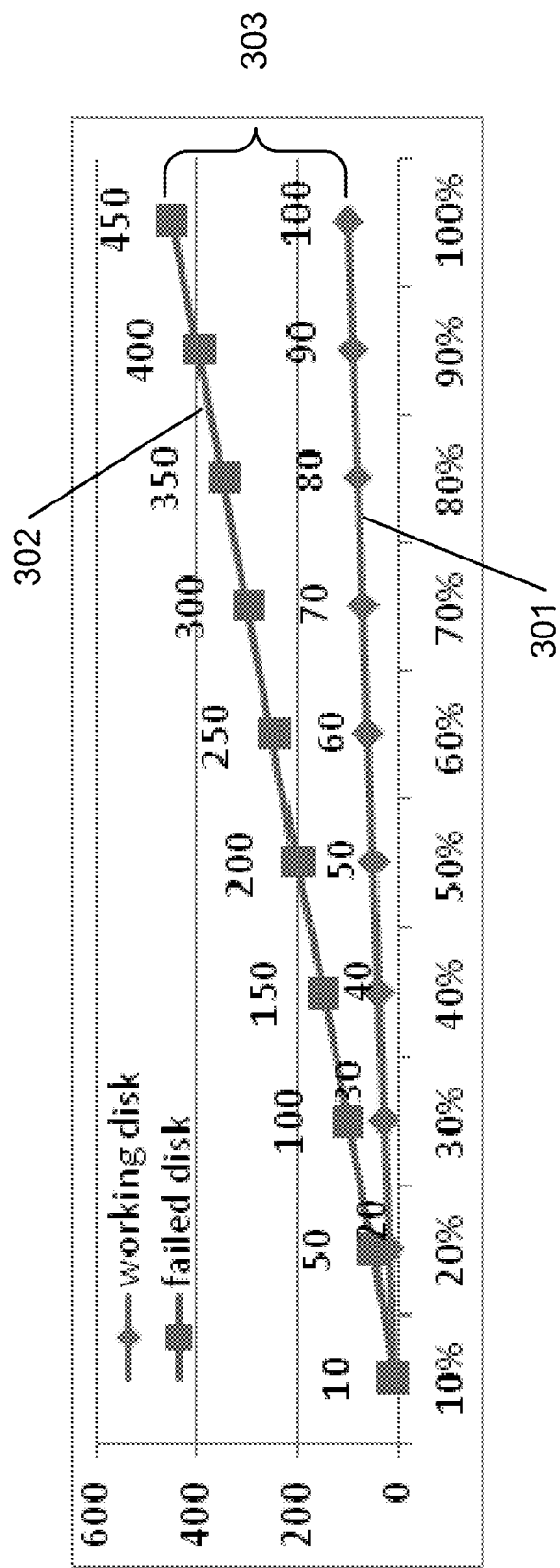
FIGS. 3A and 3B are diagrams illustrating certain quantile distribution representations which may be used with an embodiment of the invention.

These two arrays are then plotted against the percentiles of number of the disks involved (e.g., 10 disks here) to generate the quantile distribution representations or graphs for both the known failed disks and known working disks, as shown in FIG. 3A. In the example as shown in FIG. 3A, a first quantile distribution representation 301 is generated representing the known working disks while a second quantile distribution representation 302 is generated representing the known failed disks. Referring to FIG. 3A, two quantile distribution representations are then analyzed to determine the maximum or most significant difference value between the two quantile distribution representations 301-302. In the example as shown in FIG. 3A, the maximum difference value 303 can be identified at the 100% location, where the maximum difference value is (450−100)=350.

Similar processes are performed for all of the diagnostic parameters that have been selected as disk failure indicator candidates. The maximum difference values associated with the diagnostic parameters are compared with each other. In one embodiment, one of the diagnostic parameter associated with the largest difference value amongst all may be selected as a disk failure indicator. In one embodiment, a distance between two quantile curves may be evaluated by calculating the area size between the two curves. This takes into account all the points on the curves rather than one specific point. The parameter that has the biggest area size between two curve is the best disk failure indicator.

Figure 3B:
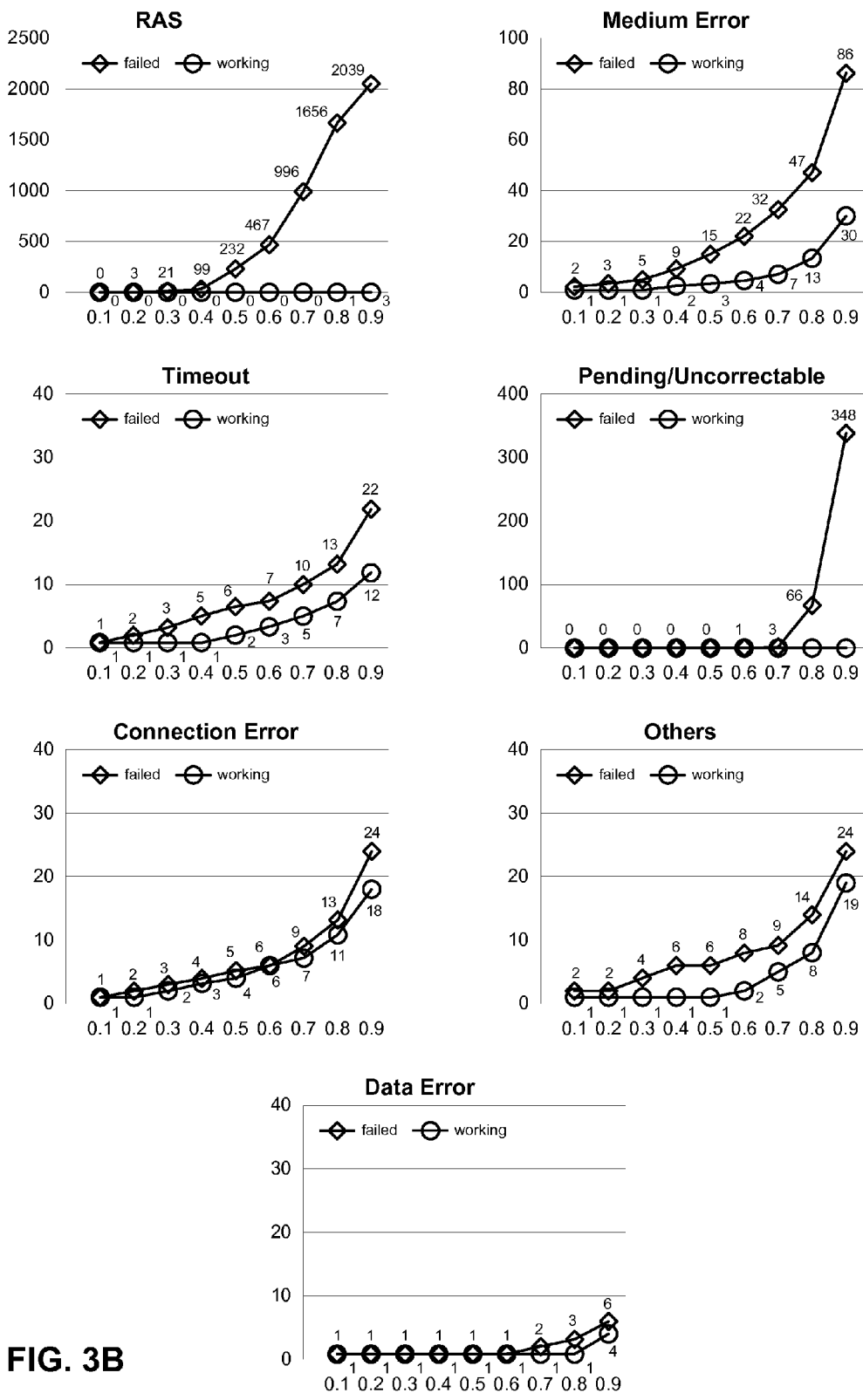

FIG. 3B is a diagram illustrating quantile distributions of various diagnostic parameters according to certain embodiments of the invention. Referring to FIG. 3B, for the purpose of illustration, the quantile distribution representations are generated based on certain selective diagnostic parameters, such as reallocated sector (EAS, with code 0x05), medium error, timeout, pending sector (0xC5) or uncorrectable sector (0xC6), connection error, data error, and other errors. However, other diagnostic parameters such as those S.M.A.R.T. attributes listed in the Appendix below can also be utilized to generate the quantile distribution representations.

As shown in FIG. 3B, the maximum difference value in the RAS quantile distribution representation is the largest amongst all of the quantile distribution representations. Thus, in this example, RAS should be selected as the best disk failure indicator for the purpose of indicating or predicting future disk failures. Note that the diagnostic parameters may be collected from a set of known or predetermined failed disks and working disks of a particular operating environment, which may be associated with a particular vendor, a customer or enterprise site, or a service provider, etc. Different configurations or disk manufacturers may yield different values of diagnostic parameters, and their interpretation or definition may be different. Therefore, the selected disk failure indicator may be more accurate for indicating or predicting future disk failures in the same or similar operating environment in which those known failed dirks and working disks once operated.

Figure 4:
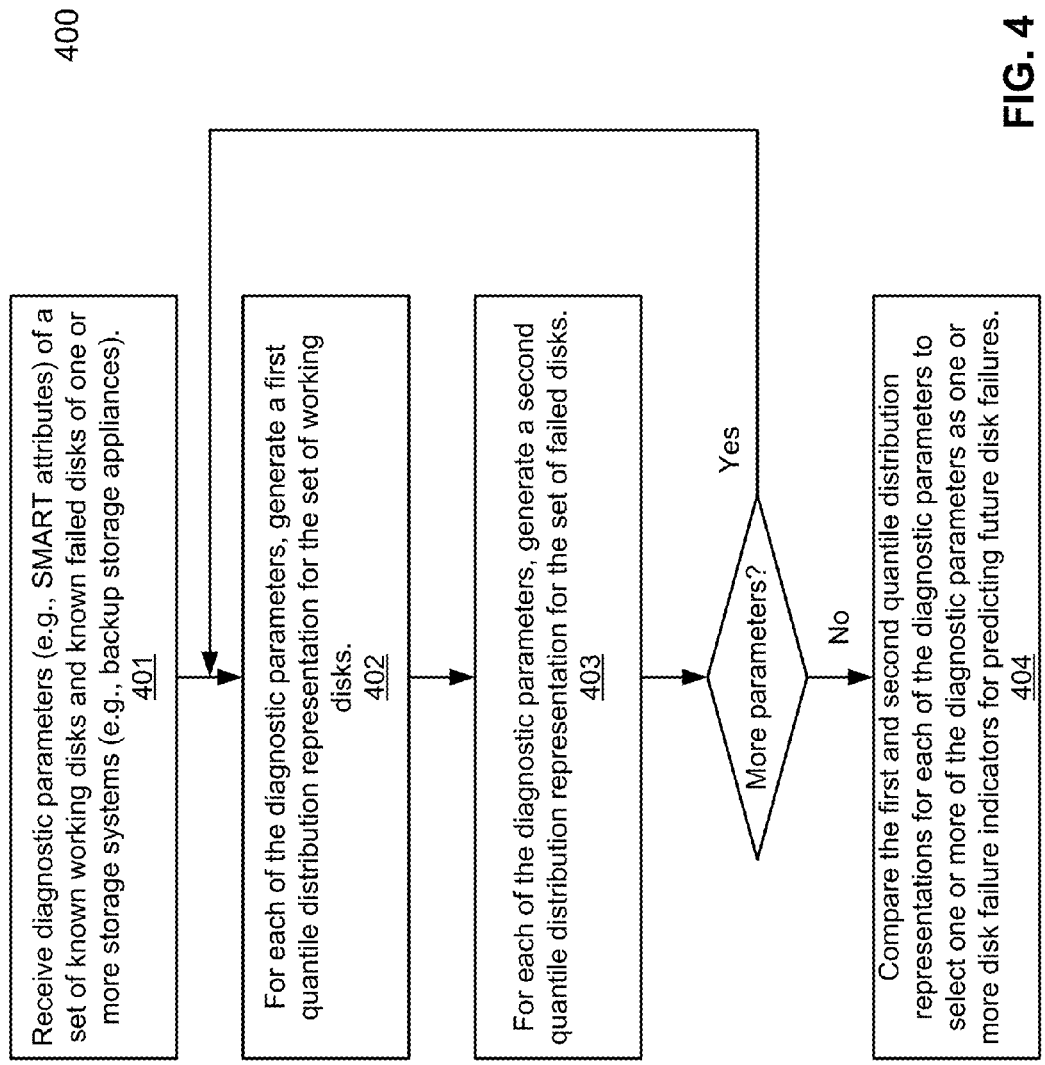
FIG. 4 is a flow diagram illustrating a method for determining a disk failure indicator according to one embodiment of the invention.

FIG. 4 is a flow diagram illustrating a method for determining a disk failure indicator according to one embodiment of the invention. Method 400 may be performed by processing logic which may include software, hardware, or a combination thereof. For example, method 400 may be performed by analysis module 153 of FIG. 1. Referring to FIG. 4, at block 401, processing logic receives diagnostic parameters (e.g., certain selected S.M.A.R.T. attributes) of a set of known or predetermined failed disks and working disks associated with one or more storage systems (e.g., backup storage systems). At block 402, for each of the diagnostic parameters, processing logic generates a first quantile distribution representation or graph for the set of working disks. At block 403, processing logic generates a second quantile distribution representation for the set of failed disks. Once all of the quantile distribution representations for all of the diagnostic parameters have been generated, at block 404, the first and second quantile representations of each diagnostic parameter are compared to select one or more of the diagnostic parameters as one or more disk failure indicators. Specifically, for each diagnostic parameter, a maximum or most significant difference value is determined, as described above, between the two quantile distribution representations that represent a set of known working disks and a set of known failed disks, respectively. All the maximum difference values of all diagnostic parameters are compared to select the largest difference value amongst all to be a disk failure indicator. Alternatively, multiple diagnostic parameters whose maximum difference values greater than a predetermined threshold may be selected as multiple disk failure indicators.

According to one embodiment of the invention, once a disk failure indicator has been selected, the disk failure indicator may be used to predict the disk failure probability of a particular disk, referred to as a target disk of a target storage system. A value of a particular diagnostic parameter (e.g., predetermined diagnostic parameter representing the determined disk failure indicator) is obtained from a target disk, for example, using a diagnostic tool such as a S.M.A.R.T. compatible monitoring tool. The value of the predetermined diagnostic parameter is then compared to a predetermined threshold that is associated the predetermined diagnostic parameter to determine a probability of disk failures for the target disk. For example, if the value of the predetermined diagnostic parameter is greater than the predetermined threshold, the target disk is considered having a higher risk of future disk failures; otherwise, the target disk is considered as a working disk with a lower risk of disk failures. The value that is used to compare the predetermined threshold may be an averaged value or a mathematical representation or function of many values collected from the target disk over a predetermined period of time. In one embodiment, the predetermined threshold may be an optimal threshold that is determined based on the balances between the accuracy of detecting future disk failures and the risk of false positive detection of the target disk.

Figure 5:
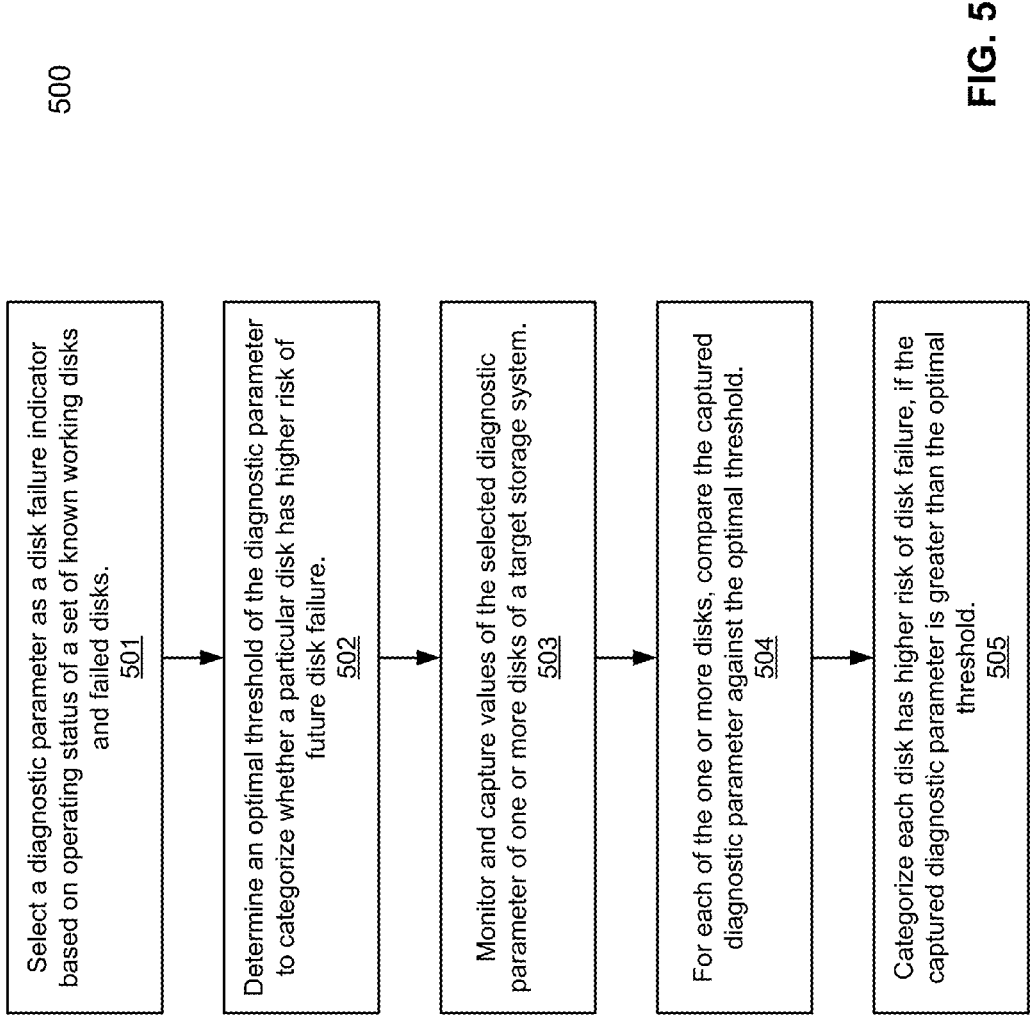
FIG. 5 is a flow diagram illustrating a method for predicting disk failures of a single disk according to one embodiment of the invention.

FIG. 5 is a flow diagram illustrating a method for predicting disk failures of a single disk according to one embodiment of the invention. Method 500 may be performed by processing logic which may include software, hardware, or a combination thereof. For example, method 400 may be performed by disk failure predictor 152 of FIG. 1. Referring to FIG. 5, at block 501, processing logic selects a diagnostic parameter as a disk failure indicator based on operating status of a set of known working disks and known failed disks. The disk failure indicator may be selected using the techniques as described above. At block 502, processing logic determines an optimal threshold for the diagnostic parameter to categorize whether a particular disk (e.g., a target disk) has a higher risk of disk failures. At block 503, processing logic monitors or receives values of the selected diagnostic parameter from one or more disks of a target storage system. For each of the disks, at block 504, the values of diagnostic parameter of the disks are compared with the optimal threshold. At block 505, processing logic categorizes a disk having a higher risk of disk failure if the value of the parameter of that disk is greater than the optimal threshold.

As illustrated above, the optimal threshold may determine the accuracy of the prediction. A too-high or too-low threshold may lead to missing certain potential failed disks and/or false positive working disks. In one embodiment, values of a predetermined diagnostic parameter (representing the selected disk failure indicator, such as the reallocated sector count as part of S.M.A.R.T. attributes) are collected from a set of known failed disks and known working disks associated with a target storage system. A first and second quantile distribution graphs of the values of the predetermined diagnostic parameter for the known failed disks and known working disks are generated, respectively, in view of a range of values of the known failed disks. An optimal threshold of the values of the predetermined diagnostic parameter is determined by comparing the first and second quantile distribution graphs. In one embodiment, the optimal threshold is identified at a location where the difference between the first and second quantile distribution graphs reaches the maximum. The optimal threshold is then utilized to indicate or predict whether a particular target disk may have a higher probability of disk failure, for example, by comparing the value of the predetermined diagnostic obtained from the target disk against the optimal threshold.

In one embodiment, all historical failed disks and working disks are analyzed. The prediction system calculates how many failed disks would be captured by a certain threshold (referred to as an accuracy prediction) and how many working disks would be captured by this threshold (referred to as false positive). A first curve or first set of data points of the accuracy prediction and a second curve or second set of data points of the false positive as a function of different thresholds (e.g., threshold candidates) are generated, respectively. The threshold which has the biggest difference between the first and second curves or data points may be selected as the optimal threshold.

Figure 6:
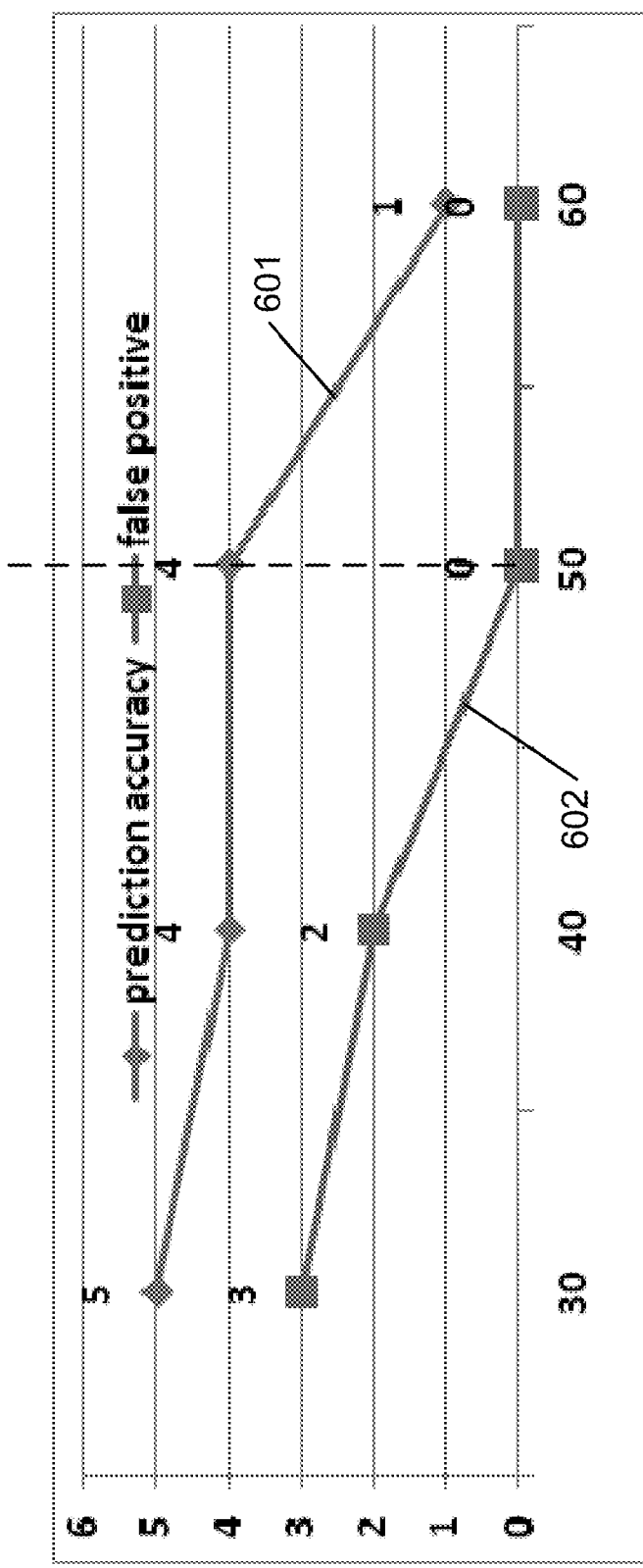
FIG. 6 is a diagram illustrating a process for determining an optimal threshold for predicting disk failures according to one embodiment of the invention.

Assuming there are five failed disks with a selected diagnostic parameter (e.g., selected disk failure indicator), in this example RAS, having values of [30, 50, 50, 50, 60] (which may be sorted in a predetermined order such as ascending order). Five working disks with RAS=[10, 20, 30, 40, 40]. In one embodiment, the range of values obtained from the known failed disks may be utilized as a set of threshold candidates. For example, if the RAS threshold is set to be 30, the prediction algorithm will capture all the disks having RAS>=30 and regard them as impending failures. So it can capture 5 failed disks and 3 working disks. So prediction accuracy=5, false positive=3. Likewise, if the threshold is set to be 40, prediction accuracy=4 and false positive=2. If the threshold is set to be 50, accuracy=4 and false positive=0. If the threshold is set to be 60, accuracy=1 and false positive=0, as shown in FIG. 6. From the curves as shown in FIG. 6, the largest difference in values between the prediction accuracy curve 601 and the false positive curve 602 appears at the threshold of 50. As a result, the threshold of 50 may be selected as the optimal threshold for predicting disk failures of a single target disk.

Figure 7:
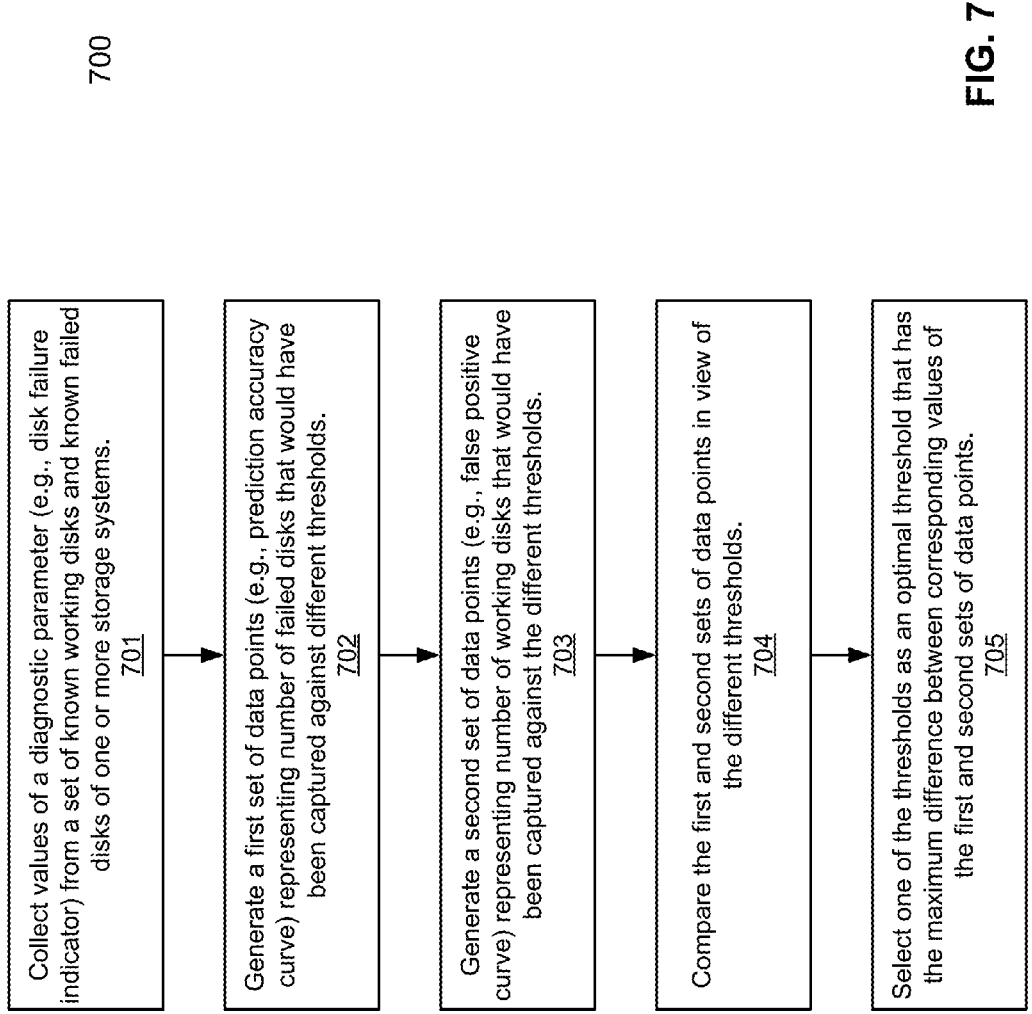
FIG. 7 is a flow diagram illustrating a method for determining an optimal threshold for predicting disk failures according to one embodiment of the invention.

FIG. 7 is a flow diagram illustrating a method for determining an optimal threshold for predicting disk failures according to one embodiment of the invention. Method 700 may be performed by processing logic which may include software, hardware, or a combination thereof. For example, method 700 may be performed by disk failure predictor 152 of FIG. 1. Referring to FIG. 7, at block 701, processing logic collects or receives values of a diagnostic parameter associated with a set of known failed disks and a set of working disks. The diagnostic parameter may have been selected as a disk failure indicator amongst many diagnostic parameters such as those listed as part of S.M.A.R.T. attributes in the Appendix I or SCISI return codes in the Appendix II below. The set of failed disks and working disks may be associated with a target storage system of which the future disk failures are to be predicted. At block 702, processing logic generates a first set of data points representing a number of known failed disks that would have been captured or identified against different thresholds or threshold candidates. The range of the thresholds may be determined by the range of the values of the diagnostic parameters of the set of failed disks. At block 703, a second set of data points is generated, representing a number of the known working disks that would have been captured against the different thresholds or threshold candidates. At block 704, the first set and second set of data points are compared in view of the different thresholds. At block 705, one of the thresholds or threshold candidates may be selected as an optimal threshold that has the maximum difference between the corresponding values of the first and second sets of data points.

According to another aspect of the invention, a selected disk failure indicator may also be used to predict the disk failure probability of multiple disks in a RAID configuration. According to one embodiment, values of a predetermined diagnostic parameter (representing the selected disk failure indicator, such as the reallocated sector count as part of S.M.A.R.T. attributes) are collected from a set of known failed disks associated with a target storage system. A quantile distribution graph is generated for the values in view of percentiles (e.g., 10%, 20%, ..., 100%) of a number of known failed disks involved in the quantile distribution. Subsequently, when values of the predetermined diagnostic parameter are collected from a set of target storage disks, the collected values are applied to the quantile distribution graph to determine their respective percentiles of the known failed disks. Each percentile represents a probability of the corresponding disk failure. The individual disk failure probabilities are then used to calculate the probability of disk failures of two or more of the target disks.

In one embodiment, values of a predetermined parameter (e.g., selected disk failure indicator such as a reallocated sector count) are collected from a set of historically known failed disks. Assuming the number of RAS value is N, the N values of the predetermined parameter are stored in an array and sorted according to a predetermined order such as ascending order from smallest to biggest. A quantile distribution is generated based on the sorted numbers. For the purpose of illustrating only, it is assumed the selected disk failure indicator is RAS parameter. In one embodiment, the value of predetermined percentile interval, in this example, 10 percentile=the RAS value at the [N*0.1] offset of the sorted array. Similarly, the value of 0.X=the RAS value at the [N*0.x] offset of the sorted array.

For example, it is assumed there are 1000 RAS values corresponding to 1000 known failed disks. After sorting of the 1000 RAS values, it is assumed the sorted array contains: 100, 105, 160 . . . (the array length=1000). If the value of 105 positioned in the sorted array happens to be 100 (array length*0.1=1000*0.1) the quintile graph or curve at 0.1 should be 105. Similarly, if value of 230 positioned in the sorted array happens to be 200 (array length*0.2=1000*0.2), the quintile graph or curve at 0.2 should be 230. It is assumed that for a particular set of known failed disks, its quantile distribution graph is shown in FIG. 8A.

Once the quantile distribution graph has been established, according to one embodiment, it can be used to predict multiple-disk failure scenario, for example, by calculating the probability of individual disk failures and then determining the probability of two or more disks. For example, as shown in FIG. 8A, if a target disk's corresponding parameter value is around 230, its individual probability of disk failures is about 50%. Similarly, if a target disk's corresponding parameter value is around 450, its individual probability of disk failures is about 60%, etc.

For the purpose of illustration, it is assumed there are four disks having the predetermined parameter of [11, 30, 110, 240]. By applying these numbers into the quantile distribution graph as shown in FIG. 8A, for example, by looking up these numbers in the Y axis of the graph, we can obtain their respective failure probability numbers from the corresponding X axis of the graph. In this example, value 11 of the disk 1 falls between [0.2, 0.3]; value 30 of disk 2 falls between [0.3, 0.4]; value 110 of disk 3 falls between [0.4, 0.5]; and value 240 of disk 4 falls between [0.5, 0.6]. According to one embodiment, the probability will be selected as an upper bound of the range (although a lower bound can also be utilized). As a result, the individual failure probabilities of these four disks are [0.3, 0.4, 0.5, 0.6], respectively as shown in FIG. 8B.

Figures 8A, 8B:
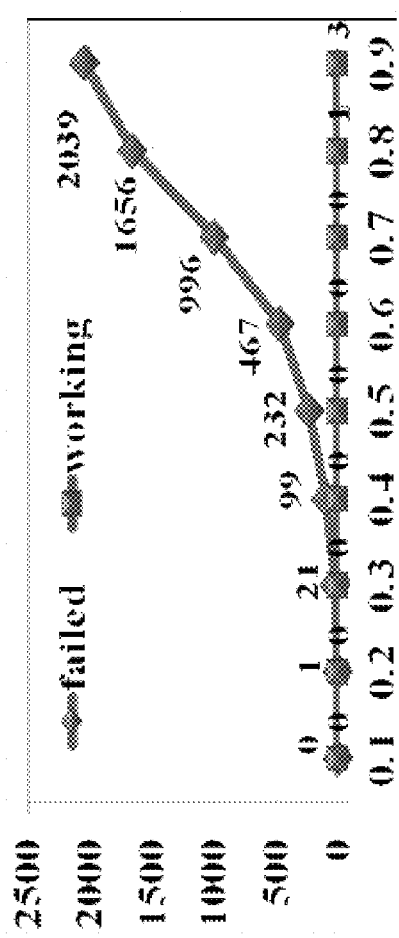
FIGS. 8A and 8B are diagrams illustrating a process for predicting multi-disk failures according to one embodiment of the invention.

From the individual failure probabilities of individual disks, their corresponding probabilities of working disks can be derived as P(work)=1−P(fail), as shown in FIG. 8B. In a RAID configuration, the RAID group failure can be defined as two or more disk failures in this example:

P(RAID group failure)=P(disk failure number>=2)=
1−P(disk_failure_num=0)−P(disk_failure_num=1).
P (disk_failure_num=0)=
P(disk1_w)*P(disk2_w)*P(disk3_w)*P(disk4_w).
P(disk_failure_num=1)=
P(disk1_failure)*P(disk2_w)*P(disk3_w)*P(disk4_w)+P(disk1_w)*
P(disk2_failure)*P(disk3_w)*P(disk4_w)+P(disk1_w)*P(disk2_w)*
P(disk3_failure)*P(disk4_w)+P(disk1_w)*P(disk2_w)*P(disk3_w)*
P(disk4_failure).

P(disk failure number=0) refers to the probability of no disk failure. P(disk failure number=1) refers to the probability of one disk failure. P(disk1_w), P(disk2_w), P(disk3_w), and P(disk4_w) refer to the probabilities of working disk for disk 1 to disk 4, respectively. P(disk1_failure), P(disk2_failure), P(disk3_failure), and P(disk4_failure) refer to the probabilities of disk failure for disk 1 to disk 4, respectively. Similarly, the probability of more than any number of disks can also be calculated. According to one embodiment, there are two tunable parameters: 1) the number of fail disks to be prevented, where the default number here is >=2 and 2) the number of disks in the RAID group (in this example, the number of disks is 3). Both numbers are adjustable based on different requirements and system settings.

Figure 9:
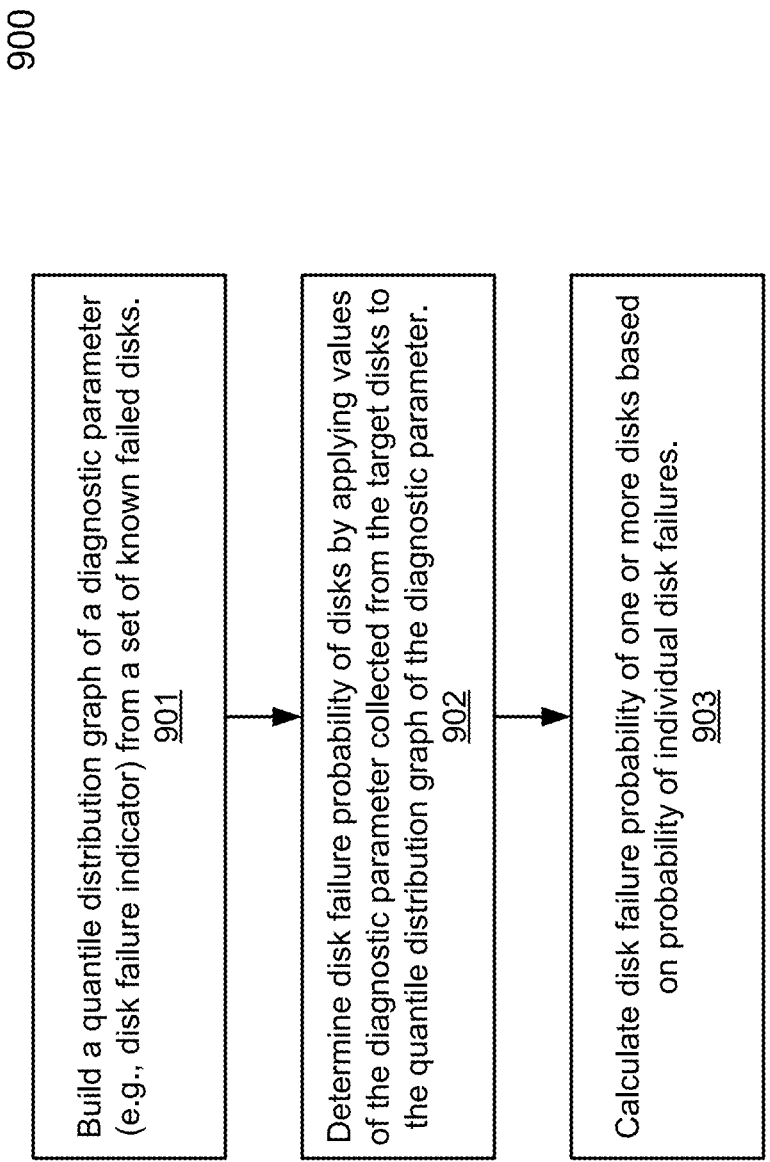
FIG. 9 is a flow diagram illustrating a method for predicting multiple disk failures according to one embodiment of the invention.

FIG. 9 is a flow diagram illustrating a method for predicting multiple disk failures according to one embodiment of the invention. Method 900 can be performed by processing logic which may include software, hardware, or a combination thereof. For example, method 900 may be performed by disk failure predictor 152 of FIG. 1. Referring to FIG. 9, at block 901, processing logic builds a quantile distribution graph of a diagnostic parameter (e.g., selected disk failure indicator) from a set of known failed disks. At block 902, processing logic determines disk failure probability of disks by applying values of the diagnostic parameter collected from the target disks to the quantile distribution graph. At block 903, the disk failure probability of multiple disks is then calculated from the individual disk failure probability of the individual target disks.

Figure 10:
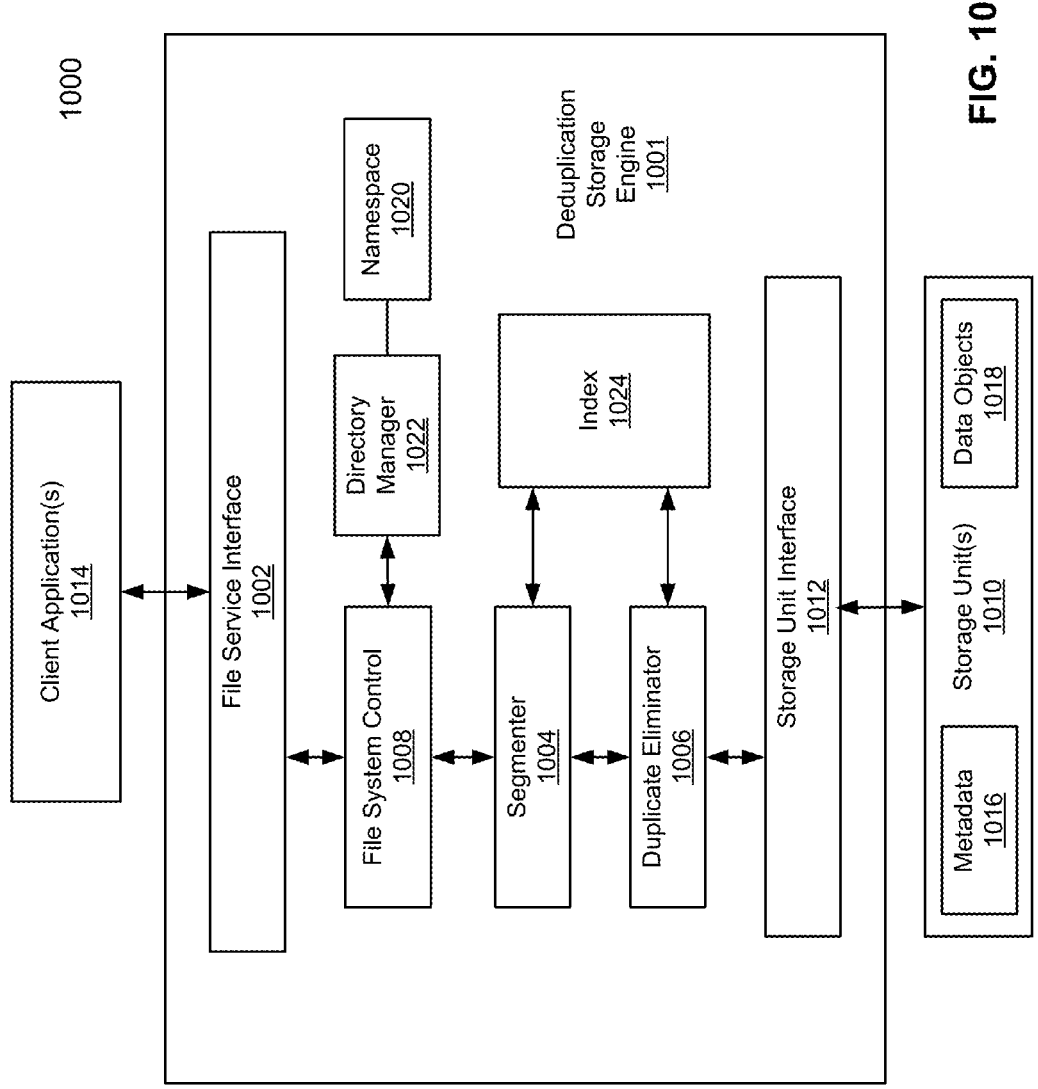
FIG. 10 is a block diagram illustrating a deduplicated storage system according to one embodiment of the invention.

FIG. 10 is a block diagram illustrating a deduplication storage system according to one embodiment of the invention. For example, deduplication storage system 1000 may be implemented as part of a deduplication storage system as described above, such as, for example, the deduplication storage system as shown in FIG. 1. In one embodiment, storage system 1000 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 1000 may have a distributed architecture, or all of its components may be integrated into a single unit. Storage system 1000 may be implemented as part of an archive and/or backup system such as a deduplicating storage system available from EMC® Corporation of Hopkinton, Mass.

In one embodiment, storage system 1000 includes a deduplication engine 1001 interfacing one or more clients 1014 with one or more storage units 1010 storing metadata 1016 and data objects 1018. Clients 1014 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1010 may be implemented locally (e.g., single node operating environment) or remotely (e.g., multi-node operating environment) via an interconnect, which may be a bus and/or a network. In one embodiment, one of storage units 1010 operates as an active storage to receive and store external or fresh user data, while the another one of storage units 1010 operates as a target storage unit to periodically archive data from the active storage unit according to an archiving policy or scheme. Storage units 1010 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1010 may also be combinations of such devices. In the case of disk storage media, the storage units 1010 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1016, may be stored in at least some of storage units 1010, such that files can be accessed independent of another storage unit. Metadata of each storage unit includes enough information to provide access to the files it contains. In one embodiment, metadata may include fingerprints contained within data objects 1018, where a data object may represent a data chunk (also referred to as a data segment), a compression region (CR) of one or more data chunks, or a container of one or more CRs. Fingerprints are mapped to a particular data object via metadata 1016, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit identifier identifying a storage unit in which the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1001 includes file service interface 1002, segmenter 1004, duplicate eliminator 1006, file system control 1008, and storage unit interface 1012. Deduplication storage engine 1001 receives a file or files (or data item(s)) via file service interface 1002, which may be part of a file system namespace 1020 of a file system associated with the deduplication storage engine 1001. The file system namespace 1020 refers to the way files are identified and organized in the system. An example is to organize the files hierarchically into directories or folders, which may be managed by directory manager 1022. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004, also referred to as a content store, breaks the file(s) into variable-length chunks based on a variety of rules or considerations. For example, the file(s) may be broken into chunks by identifying chunk boundaries using a content-based technique (e.g., a function is calculated at various locations of a file, when the function is equal to a value or when the value is a minimum, a maximum, or other value relative to other function values calculated for the file), a non-content-based technique (e.g., based on size of the chunk), or any other appropriate technique. In one embodiment, a chunk is restricted to a minimum and/or maximum length, to a minimum or maximum number of chunks per file, or any other appropriate limitation.

In one embodiment, file system control 1008, also referred to as a file system manager, processes information to indicate the chunk(s) association with a file. In some embodiments, a list of fingerprints is used to indicate chunk(s) associated with a file. File system control 1008 passes chunk association information (e.g., representative data such as a fingerprint) to index 1024. Index 1024 is used to locate stored chunks in storage units 1010 via storage unit interface 1012. Duplicate eliminator 1006, also referred to as a segment store, identifies whether a newly received chunk has already been stored in storage units 1010. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 1010 that make up the file. Chunks are then packed by a container manager (which may be implemented as part of storage unit interface 1012) into one or more storage containers stored in storage units 1010. The deduplicated chunks may be further compressed into one or more CRs using a variation of compression algorithms, such as a Lempel-Ziv algorithm before being stored. A container may contains one or more CRs and each CR may contain one or more deduplicated chunks (also referred to deduplicated segments). A container may further contain the metadata such as fingerprints, type of the data chunks, etc. that are associated with the data chunks stored therein.

When a file is to be retrieved, file service interface 1002 is configured to communicate with file system control 1008 to identify appropriate chunks stored in storage units 1010 via storage unit interface 1012. Storage unit interface 1012 may be implemented as part of a container manager. File system control 1008 communicates (e.g., via segmenter 1004) with index 1024 to locate appropriate chunks stored in storage units via storage unit interface 1012. Appropriate chunks are retrieved from the associated containers via the container manager and are used to construct the requested file. The file is provided via interface 1002 in response to the request. In one embodiment, file system control 1008 utilizes a tree (e.g., a chunk tree obtained from namespace 1020) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1001 may be implemented in software, hardware, or a combination thereof. For example, deduplication engine 1001 may be implemented in a form of executable instructions that can be stored in a machine-readable storage medium, where the instructions can be executed in a memory by a processor.

In one embodiment, storage system 1000 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

APPENDIX I

| | | S.M.A.R.T. Attributes | |
|---|---|---|---|
| ID | Hex | Attribute Name | Description |
| 01 | 0x01 | Read Error Rate | (Vendor specific raw value.) Stores data related to the rate of hardware read errors that occurred when reading data from a disk surface. The raw value has different structure for different vendors and is often not meaningful as a decimal number. |
| 02 | 0x02 | Throughput Performance | Overall (general) throughput performance of a hard disk drive. If the value of this attribute is decreasing there is a high probability that there is a problem with the disk. |
| 03 | 0x03 | Spin-Up Time | Average time of spindle spin up (from zero RPM to fully operational [milliseconds]). |
| 04 | 0x04 | Start/Stop Count | A tally of spindle start/stop cycles. The spindle turns on, and hence the count is increased, both when the hard disk is turned on after having before been turned entirely off (disconnected from power source) and when the hard disk returns from having previously been put to sleep mode. |
| 05 | 0x05 | Reallocated Sectors Count | Count of reallocated sectors. When the hard drive finds a read/write/verification error, it marks that sector as "reallocated" and transfers data to a special reserved area (spare area). This process is also known as remapping, and reallocated sectors are called "remaps". The raw value normally represents a count of the bad sectors that have been found and remapped. Thus, the higher the attribute value, the more sectors the drive has had to reallocate. This allows a drive with bad sectors to continue operation; however, a drive which has had any reallocations at all is significantly more likely to fail in the near future. While primarily used as a metric of the life |

APPENDIX I-continued

S.M.A.R.T. Attributes

| ID | Hex | Attribute Name | Description |
|---|---|---|---|
| | | | expectancy of the drive, this number also affects performance As the count of reallocated sectors increases, the read/write speed tends to become worse because the drive head is forced to seek to the reserved area whenever a remap is accessed. If sequential access speed is critical, the remapped sectors can be manually marked as bad blocks in the file system in order to prevent their use. |
| 06 | 0x06 | Read Channel Margin | Margin gin of a channel while reading data The function of this attribute is not specified. |
| 07 | 0x07 | Seek Error Rate | (Vendor specific raw value.) Rate of seek errors of the magnetic heads. If there is a partial failure in the mechanical positioning system, then seek errors will arise. Such a failure may be due to numerous factors, such as damage to a servo, or thermal widening of the hard disk. The raw value has different structure for different vendors and is often not meaningful as a decimal number. |
| 08 | 0x08 | Seek Time Performance | Average performance of seek operations of the magnetic heads. If this attribute is decreasing, it is a sign of problems in the mechanical subsystem. |
| 09 | 0x09 | Power-On Hours (POH) | Count of hours in power-on state. The raw value of this attribute shows total count of hours (or minutes, or seconds, depending on manufacturer) in power-on state.<br>On some pre-2005 drives, this raw value may advance erratically and/or "wrap around" (reset to zero periodically). |
| 10 | 0x0A | Spin Retry Count | Count of retry of spin start attempts. This attribute stores a total count of the spin start attempts to reach the fully operational speed (under the condition that the first attempt was unsuccessful). An increase of this attribute value is a sign of problems in the hard disk mechanical subsystem. |
| 11 | 0x0B | Recalibration Retries or Calibration Retry Count | This attribute indicates the count that recalibration was requested (under the condition that the first attempt was unsuccessful). An increase of this attribute value is a sign of problems in the hard disk mechanical subsystem. |
| 12 | 0x0C | Power Cycle Count | This attribute indicates the count of full hard disk power on/off cycles. |
| 13 | 0x0D | Soft Read Error Rate | Uncorrected read errors reported to the operating system. |
| 180 | 0xB4 | Unused Reserved Block Count Total | "Pre-Fail" Attribute used at least in HP devices. |
| 181 | 0xB5 | Program Fail Count Total or Non-4K Aligned Access Count | Total number of Flash program operation failures since the drive was deployed.<br>Number of user data accesses (both reads and writes) where LBAs are not 4 KiB aligned (LBA % 8 != 0) or where size is not modulus 4 KiB (block count != 8), assuming logical block size (LBS) = 512 B |
| 183 | 0xB7 | SATA Downshift Error Count or Runtime Bad Block | Western Digital and Samsung attribute.<br>(or)<br>Seagate. |
| 184 | 0xB8 | End-to-End error / IOEDC | This attribute is a part of Hewlett-Packard's SMART IV technology, as well as part of other vendors' IO Error Detection and Correction schemas, and it contains a count of parity errors which occur in the data path to the media via the drive's cache RAM. |
| 185 | 0xB9 | Head Stability | Western Digital attribute. |
| 186 | 0xBA | Induced Op Vibration Detection | Western Digital attribute. |
| 187 | 0xBB | Reported Uncorrectable Errors | The count of errors that could not be recovered using hardware ECC (see attribute 195). |
| 188 | 0xBC | Command Timeout | The count of aborted operations due to HDD timeout. Normally this attribute value should be equal to zero and if the value is far above zero, then most likely there will be some serious problems with power supply or an oxidized data cable. |
| 189 | 0xBD | High Fly Writes | HDD producers implement a Fly Height Monitor that attempts to provide additional protections for write operations by detecting when a recording head is flying outside its normal operating range. If an unsafe fly height condition is encountered, the write process is stopped, and the information is rewritten or reallocated to a safe region of the hard drive. This attribute indicates the count of these errors detected over the lifetime of the drive. This feature is implemented in most modern Seagate drives til and some of Western Digital's drives, beginning with the WD Enterprise WDE18300 and WDE9180 Ultra2 SCSI hard drives, and will be included on all future WD Enterprise products. |
| 190 | 0xBE | Airflow Temperature (WDC) resp. Airflow Temperature Celsius (HP) | Airflow temperature on Western Digital HDs (Same as temp. [C2], but current value is 50 less for some models. Marked as obsolete.) |
| 190 | 0xBE | Temperature Difference from 100 | Value is equal to (100-temp. ° C.), allowing manufacturer to set a minimum threshold which corresponds to a maximum temperature. |
| 191 | 0xBF | G-sense Error Rate | The count of errors resulting from externally induced shock & vibration. |
| 192 | 0xC0 | Power-off Retract Count or Emergency Retract Cycle Count (Fujitsu)[23] | Count of times the heads are loaded off the media. Heads can be unloaded without actually powering off. |

APPENDIX I-continued

S.M.A.R.T. Attributes

| ID | Hex | Attribute Name | Description |
|---|---|---|---|
| 193 | 0xC1 | Load Cycle Count or Load/Unload Cycle Count (Fujitsu) | Count of load/unload cycles into head landing zone position. The typical lifetime rating for laptop (2.5-in) hard drives is 300,000 to 600,000 load cycles. Some laptop drives are programmed to unload the heads whenever there has not been any activity for about five seconds. Many Linux installations write to the file system a few times a minute in the background. As a result, there may be 100 or more load cycles per hour, and the load cycle rating may be exceeded in less than a year. |
| 194 | 0xC2 | Temperature resp. Temperature Celsius | Current internal temperature. |
| 195 | 0xC3 | Hardware ECC Recovered | (Vendor specific raw value.) The raw value has different structure for different vendors and is often not meaningful as a decimal number. |
| 196 | 0xC4 | Reallocation Event Count | Count of remap operations. The raw value of this attribute shows the total count of attempts to transfer data from reallocated sectors to a spare area. Both successful & unsuccessful attempts are counted. |
| 197 | 0xC5 | Current Pending Sector Count | Count of "unstable" sectors (waiting to be remapped, because of unrecoverable read errors). If an unstable sector is subsequently read successfully, this value is decreased and the sector is not remapped. Read errors on a sector will not remap the sector immediately (since the correct value cannot be read and so the value to remap is not known, and also it might become readable later); instead, the drive firmware remembers that the sector needs to be remapped, and will remap it the next time it's written. However some drives will not immediately remap such sectors when written; instead the drive will first attempt to write to the problem sector and if the write operation is successful then the sector will be marked good (in this case, the "Reallocation Event Count"(0xC4) will not be increased). This is a serious shortcoming, for if such a drive contains marginal sectors that consistently fail only after some time has passed following a successful write operation, then the drive will never remap these problem sectors. |
| 198 | 0xC6 | Uncorrectable Sector Count or Offline Uncorrectable or Off-Line Scan Uncorrectable Sector Count | The total count of uncorrectable errors when reading/writing a sector. A rise in the value of this attribute indicates defects of the disk surface and/or problems in the mechanical subsystem. |
| 199 | 0xC7 | UltraDMA CRC Error Count | The count of errors in data transfer via the interface cable as determined by ICRC (Interface Cyclic Redundancy Check). |
| 200 | 0xC8 | Multi Zone Error Rate | The count of errors found when writing a sector. The higher the value, the worse the disk's mechanical condition is. |
| 200 | 0xC8 | Write Error Rate (Fujitsu) | The total count of errors when writing a sector. |
| 201 | 0xC9 | Soft Read Error Rate or TA Counter Detected | Count of off-track errors. |
| 202 | 0xCA | Data Address Mark errors or TA Counter Increased | Count of Data Address Mark errors (or vendor-specific). |
| 203 | 0xCB | Run Out Cancel | |
| 204 | 0xCC | Soft ECC Correction | Count of errors corrected by software ECC |
| 205 | 0xCD | Thermal Asperity Rate (TAR) | Count of errors due to high temperature. |
| 206 | 0xCE | Flying Height | Height of heads above the disk surface. A flying height that's too low increases the chances of a head crash while a flying height that's too high increases the chances of a read/write error. |
| 207 | 0xCF | Spin High Current | Amount of surge current used to spin up the drive. |
| 208 | 0xD0 | Spin Buzz | Count of buzz routines needed to spin up the drive due to insufficient power. |
| 209 | 0xD1 | Offline Seek Performance | Drive's seek performance during its internal tests. |
| 210 | 0xD2 | Vibration During Write | (found in a Maxtor 6B200M0 200 GB and Maxtor 2R015H1 15 GB disks) |
| 211 | 0xD3 | Vibration During Write | Vibration During Write |
| 212 | 0xD4 | Shock During Write | Shock During Write |
| 220 | 0xDC | Disk Shift | Distance the disk has shifted relative to the spindle (usually due to shock or temperature). Unit of measure is unknown. |
| 221 | 0xDD | G-Sense Error Rate | The count of errors resulting from externally induced shock & vibration. |
| 222 | 0xDE | Loaded Hours | Time spent operating under data load (movement of magnetic head armature) |
| 223 | 0xDF | Load/Unload Retry Count | Count of times head changes position. |
| 224 | 0xE0 | Load Friction | Resistance caused by friction in mechanical parts while operating. |
| 225 | 0xE1 | Load/Unload Cycle Count | Total count of load cycles |
| 226 | 0xE2 | Load 'In' time | Total time of loading on the magnetic heads actuator (time not spent in parking area). |
| 227 | 0xE3 | Torque Amplification Count | Count of attempts to compensate for platter speed variations |
| 228 | 0xE4 | Power-Off Retract Cycle | The count of times the magnetic armature was retracted automatically as a result of cutting power. |

APPENDIX I-continued

S.M.A.R.T. Attributes

| ID | Hex | Attribute Name | Description |
|---|---|---|---|
| 230 | 0xE6 | GMR Head Amplitude | Amplitude of "thrashing" (distance of repetitive forward/reverse head motion) |
| 230 | 0xE6 | Drive Life Protection Status | Current state of drive operation based upon the Life Curve |
| 231 | 0xE7 | Temperature | Drive Temperature |
| 231 | 0xE7 | SSD Life Left | Indicates the approximate SSD life left, in terms of program/erase cycles or Flash blocks currently available for use. |
| 232 | 0xE8 | Endurance Remaining | Number of physical erase cycles completed on the drive as a percentage of the maximum physical erase cycles the drive is designed to endure |
| 232 | 0xE8 | Available Reserved Space | Intel SSD reports the number of available reserved space as a percentage of reserved space in a brand new SSD. |
| 233 | 0xE9 | Power-On Hours | Number of hours elapsed in the power-on state. |
| 233 | 0xE9 | Media Wearout Indicator | Intel SSD reports a normalized value of 100 (when the SSD is new) and declines to a minimum value of 1. It decreases while the NAND erase cycles increase from 0 to the maximum-rated cycles. |
| 234 | 0xEA | Average erase count AND Maximum Erase Count | Decoded as: byte 0-1-2 = average erase count (big endian) and byte 3-4-5 = max erase count (big endian) |
| 235 | 0xEB | Good Block Count AND System(Free) Block Count | decoded as: byte 0-1-2 = good block count (big endian) and byte 3-4 = system(free) block count. |
| 240 | 0xF0 | Head Flying Hours | Time while head is positioning |
| 240 | 0xF0 | Transfer Error Rate (Fujitsu) | Count of times the link is reset during a data transfer. |
| 241 | 0xF1 | Total LBAs Written | Total count of LBAs written |
| 242 | 0xF2 | Total LBAs Read | Total count of LBAs read. Some S.M.A.R.T. utilities will report a negative number for the raw value since in reality it has 48 bits rather than 32. |
| 250 | 0xFA | Read Error Retry | Rate Count of errors while reading from a disk |
| 254 | 0xFE | Free Fall Protection | Count of "Free Fall Events" detected |

APPENDIX II

SCSI Return Codes

| Category | Key | ASC | ASCQ | Error Condition |
|---|---|---|---|---|
| No Sense | 0 | 00 | 00 | No error |
|  | 0 | 5D | 00 | No sense - PFA threshold reached |
| Soft Error | 1 | 01 | 00 | Recovered Write error - no index |
|  | 1 | 02 | 00 | Recovered no seek completion |
|  | 1 | 03 | 00 | Recovered Write error - write fault |
|  | 1 | 09 | 00 | Track following error |
|  | 1 | 0B | 01 | Temperature warning |
|  | 1 | 0C | 01 | Recovered Write error with auto-realloc - reallocated |
|  | 1 | 0C | 03 | Recovered Write error - recommend reassign |
|  | 1 | 12 | 01 | Recovered data without ECC using prey logical block ID |
|  | 1 | 12 | 02 | Recovered data with ECC using prey logical block ID |
|  | 1 | 14 | 01 | Recovered Record Not Found |
|  | 1 | 16 | 00 | Recovered Write error - Data Sync Mark Error |
|  | 1 | 16 | 01 | Recovered Write error - Data Sync Error - data rewritten |
|  | 1 | 16 | 02 | Recovered Write error - Data Sync Error - recommend rewrite |
|  | 1 | 16 | 03 | Recovered Write error - Data Sync Error - data auto-reallocated |
|  | 1 | 16 | 04 | Recovered Write error - Data Sync Error - recommend reassignment |
|  | 1 | 17 | 00 | Recovered data with no error correction applied |
|  | 1 | 17 | 01 | Recovered Read error - with retries |
|  | 1 | 17 | 02 | Recovered data using positive offset |
|  | 1 | 17 | 03 | Recovered data using negative offset |
|  | 1 | 17 | 05 | Recovered data using previous logical block ID |
|  | 1 | 17 | 06 | Recovered Read error - without ECC, auto reallocated |
|  | 1 | 17 | 07 | Recovered Read error - without ECC, recommend reassign |
|  | 1 | 17 | 08 | Recovered Read error - without ECC, recommend rewrite |
|  | 1 | 17 | 09 | Recovered Read error - without ECC, data rewritten |
|  | 1 | 18 | 00 | Recovered Read error - with ECC |
|  | 1 | 18 | 01 | Recovered data with ECC and retries |
|  | 1 | 18 | 02 | Recovered Read error - with ECC, auto reallocated |

APPENDIX II-continued

SCSI Return Codes

| Category | Key | ASC | ASCQ | Error Condition |
|---|---|---|---|---|
| | 1 | 18 | 05 | Recovered Read error - with ECC, recommend reassign |
| | 1 | 18 | 06 | Recovered data using ECC and offsets |
| | 1 | 18 | 07 | Recovered Read error - with ECC, data rewritten |
| | 1 | 1C | 00 | Defect List not found |
| | 1 | 1C | 01 | Primary defect list not found |
| | 1 | 1C | 02 | Grown defect list not found |
| | 1 | 1F | 00 | Partial defect list transferred |
| | 1 | 44 | 00 | Internal target failure |
| | 1 | 5D | 00 | PFA threshold reached |
| Not Ready | 2 | 04 | 00 | Not Ready - Cause not reportable. |
| | 2 | 04 | 01 | Not Ready - becoming ready |
| | 2 | 04 | 02 | Not Ready - need initialise command (start unit) |
| | 2 | 04 | 03 | Not Ready - manual intervention required |
| | 2 | 04 | 04 | Not Ready - format in progress |
| | 2 | 04 | 09 | Not Ready - self-test in progress |
| | 2 | 31 | 00 | Not Ready - medium format corrupted |
| | 2 | 31 | 01 | Not Ready - format command failed |
| | 2 | 35 | 02 | Not Ready - enclosure services unavailable |
| | 2 | 3A | 00 | Not Ready - medium not present |
| | 2 | 3A | 01 | Not Ready - medium not present - tray closed |
| | 2 | 3A | 02 | Not Ready - medium not present - tray open |
| | 2 | 4C | 00 | Diagnostic Failure - config not loaded |
| Medium Error | 3 | 02 | 00 | Medium Error - No Seek Complete |
| | 3 | 03 | 00 | Medium Error - write fault |
| | 3 | 10 | 00 | Medium Error - ID CRC error |
| | 3 | 11 | 00 | Medium Error - unrecovered read error |
| | 3 | 11 | 01 | Medium Error - read retries exhausted |
| | 3 | 11 | 02 | Medium Error - error too long to correct |
| | 3 | 11 | 04 | Medium Error - unrecovered read error - auto re-alloc failed |
| | 3 | 11 | 0B | Medium Error - unrecovered read error - recommend reassign |
| | 3 | 14 | 01 | Medium Error - record not found |
| | 3 | 16 | 00 | Medium Error - Data Sync Mark error |
| | 3 | 16 | 04 | Medium Error - Data Sync Error - recommend reassign |
| | 3 | 19 | 00 | Medium Error - defect list error |
| | 3 | 19 | 01 | Medium Error - defect list not available |
| | 3 | 19 | 02 | Medium Error - defect list error in primary list |
| | 3 | 19 | 03 | Medium Error - defect list error in grown list |
| | 3 | 19 | 0E | Medium Error - fewer than 50% defect list copies |
| | 3 | 31 | 00 | Medium Error - medium format corrupted |
| | 3 | 31 | 01 | Medium Error - format command failed |
| Hardware Error | 4 | 01 | 00 | Hardware Error - no index or sector |
| | 4 | 02 | 00 | Hardware Error - no seek complete |
| | 4 | 03 | 00 | Hardware Error - write fault |
| | 4 | 09 | 00 | Hardware Error - track following error |
| | 4 | 11 | 00 | Hardware Error - unrecovered read error in reserved area |
| | 4 | 15 | 01 | Hardware Error - Mechanical positioning error |
| | 4 | 16 | 00 | Hardware Error - Data Sync Mark error in reserved area |
| | 4 | 19 | 00 | Hardware Error - defect list error |
| | 4 | 19 | 02 | Hardware Error - defect list error in Primary List |
| | 4 | 19 | 03 | Hardware Error - defect list error in Grown List |
| | 4 | 31 | 00 | Hardware Error - reassign failed |
| | 4 | 32 | 00 | Hardware Error - no defect spare available |
| | 4 | 35 | 01 | Hardware Error - unsupported enclosure function |
| | 4 | 35 | 02 | Hardware Error - enclosure services unavailable |
| | 4 | 35 | 03 | Hardware Error - enclosure services transfer failure |
| | 4 | 35 | 04 | Hardware Error - enclosure services refused |
| | 4 | 35 | 05 | Hardware Error - enclosure services checksum error |
| | 4 | 3E | 03 | Hardware Error - self-test failed |
| | 4 | 3E | 04 | Hardware Error - unable to update self-test |
| | 4 | 44 | 00 | Hardware Error - internal target failure |
| Illegal Request | 5 | 1A | 00 | Illegal Request - parm list length error |
| | 5 | 20 | 00 | Illegal Request - invalid/unsupported command code |
| | 5 | 21 | 00 | Illegal Request - LBA out of range |
| | 5 | 24 | 00 | Illegal Request - invalid field in CDB (Command Descriptor Block) |
| | 5 | 25 | 00 | Illegal Request - invalid LUN |
| | 5 | 26 | 00 | Illegal Request - invalid fields in parm list |
| | 5 | 26 | 01 | Illegal Request - parameter not supported |
| | 5 | 26 | 02 | Illegal Request - invalid parm value |

APPENDIX II-continued

SCSI Return Codes

| Category | Key | ASC | ASCQ | Error Condition |
|---|---|---|---|---|
| | 5 | 26 | 03 | Illegal Request - invalid field parameter - threshold parameter |
| | 5 | 26 | 04 | Illegal Request - invalid release of persistent reservation |
| | 5 | 2C | 00 | Illegal Request - command sequence error |
| | 5 | 35 | 01 | Illegal Request - unsupported enclosure function |
| | 5 | 49 | 00 | Illegal Request - invalid message |
| | 5 | 53 | 00 | Illegal Request - media load or eject failed |
| | 5 | 53 | 01 | Illegal Request - unload tape failure |
| | 5 | 53 | 02 | Illegal Request - medium removal prevented |
| | 5 | 55 | 00 | Illegal Request - system resource failure |
| | 5 | 55 | 01 | Illegal Request - system buffer full |
| | 5 | 55 | 04 | Illegal Request - Insufficient Registration Resources |
| Unit Attention | 6 | 28 | 00 | Unit Attention - not-ready to ready transition (format complete) |
| | 6 | 29 | 00 | Unit Attention - POR or device reset occurred |
| | 6 | 29 | 01 | Unit Attention - POR occurred |
| | 6 | 29 | 02 | Unit Attention - SCSI bus reset occurred |
| | 6 | 29 | 03 | Unit Attention - TARGET RESET occurred |
| | 6 | 29 | 04 | Unit Attention - self-initiated-reset occurred |
| | 6 | 29 | 05 | Unit Attention - transceiver mode change to SE |
| | 6 | 29 | 06 | Unit Attention - transceiver mode change to LVD |
| | 6 | 2A | 00 | Unit Attention - parameters changed |
| | 6 | 2A | 01 | Unit Attention - mode parameters changed |
| | 6 | 2A | 02 | Unit Attention - log select parms changed |
| | 6 | 2A | 03 | Unit Attention - Reservations pre-empted |
| | 6 | 2A | 04 | Unit Attention - Reservations released |
| | 6 | 2A | 05 | Unit Attention - Registrations pre-empted |
| | 6 | 2F | 00 | Unit Attention - commands cleared by another initiator |
| | 6 | 3F | 00 | Unit Attention - target operating conditions have changed |
| | 6 | 3F | 01 | Unit Attention - microcode changed |
| | 6 | 3F | 02 | Unit Attention - changed operating definition |
| | 6 | 3F | 03 | Unit Attention - inquiry parameters changed |
| | 6 | 3F | 05 | Unit Attention - device identifier changed |
| | 6 | 5D | 00 | Unit Attention - PFA threshold reached |
| Write Protect | 7 | 27 | 00 | Write Protect - command not allowed |
| Aborted Command | B | 00 | 00 | Aborted Command - no additional sense code |
| | B | 1B | 00 | Aborted Command - sync data transfer error (extra ACK) |
| | B | 25 | 00 | Aborted Command - unsupported LUN |
| | B | 3F | 0F | Aborted Command - echo buffer overwritten |
| | B | 43 | 00 | Aborted Command - message reject error |
| | B | 44 | 00 | Aborted Command - internal target failure |
| | B | 45 | 00 | Aborted Command - Selection/Reselection failure |
| | B | 47 | 00 | Aborted Command - SCSI parity error |
| | B | 48 | 00 | Aborted Command - initiator-detected error message received |
| | B | 49 | 00 | Aborted Command - inappropriate/illegal message |
| | B | 4B | 00 | Aborted Command - data phase error |
| | B | 4E | 00 | Aborted Command - overlapped commands attempted |
| | B | 4F | 00 | Aborted Command - due to loop initialisation |
| Other | E | 1D | 00 | Miscompare - during verify byte check operation |
| | x | 05 | 00 | Illegal request |
| | x | 06 | 00 | Unit attention |
| | x | 07 | 00 | Data protect |
| | x | 08 | 00 | LUN communication failure |
| | x | 08 | 01 | LUN communication timeout |
| | x | 08 | 02 | LUN communication parity error |
| | x | 08 | 03 | LUN communication CRC error |
| | x | 09 | 00 | vendor specific sense key |
| | x | 09 | 01 | servo fault |
| | x | 09 | 04 | head select fault |
| | x | 0A | 00 | error log overflow |
| | x | 0B | 00 | aborted command |
| | x | 0C | 00 | write error |
| | x | 0C | 02 | write error - auto-realloc failed |
| | x | 0E | 00 | data miscompare |
| | x | 12 | 00 | address mark not found for ID field |
| | x | 14 | 00 | logical block not found |
| | x | 15 | 00 | random positioning error |
| | x | 15 | 01 | mechanical positioning error |
| | x | 15 | 02 | positioning error detected by read of medium |
| | x | 27 | 00 | write protected |
| | x | 29 | 00 | POR or bus reset occurred |
| | x | 31 | 01 | format failed |

APPENDIX II-continued

SCSI Return Codes

| Category | Key | ASC | ASCQ | Error Condition |
|---|---|---|---|---|
| | x | 32 | 01 | defect list update error |
| | x | 32 | 02 | no spares available |
| | x | 35 | 01 | unspecified enclosure services failure |
| | x | 37 | 00 | parameter rounded |
| | x | 3D | 00 | invalid bits in identify message |
| | x | 3E | 00 | LUN not self-configured yet |
| | x | 40 | 01 | DRAM parity error |
| | x | 40 | 02 | DRAM parity error |
| | x | 42 | 00 | power-on or self-test failure |
| | x | 4C | 00 | LUN failed self-configuration |
| | x | 5C | 00 | RPL status change |
| | x | 5C | 01 | spindles synchronised |
| | x | 5C | 02 | spindles not synchronised |
| | x | 65 | 00 | voltage fault |
| | x | ≥80 | x | Vendor specific |
| | x | x | ≥80 | Vendor specific |

What is claimed is:

1. A computer-implemented method for predicting disk failures in a redundant array of independent disks (RAID) environment, the method comprising:
receiving first values of a predetermined diagnostic parameter collected from a set of known failed disks of a storage system;
generating a quantile distribution graph of the first values against percentiles of a number of known failed disks;
in response to second values of the predetermined diagnostic parameter collected from a set of target disks, applying each of the second values to the quantile distribution graph to determine a corresponding percentile for each of the target disks, which represents a failure probability of a corresponding one of the target disks; and
calculating a failure probability of two or more of the target disks based on the determined percentiles of the target disks.

2. The method of claim 1, wherein the predetermined diagnostic parameter is one of a reallocated sector count, a medium error, a timeout, a pending sector count, an uncorrectable sector count, a connection error, and a data error.

3. The method of claim 1, wherein the first values are presented in the quantile distribution graph at a 10 percentile interval of the number of known failed disks.

4. The method of claim 1, wherein applying each of the second values to the quantile distribution graph comprises:
determining an interval between a lower percentile and an upper percentile in which a particular second value of the predetermined diagnostic parameter falls on the quantile distribution graph; and
assigning the upper percentile, as an individual failure probability, to a disk associated with that particular second value of the predetermined diagnostic parameter.

5. The method of claim 1, further comprising selecting the predetermined diagnostic parameter as a disk failure indicator that can most successfully indicate a failed disk based on a plurality of diagnostic parameters collected from a set of known failed disks and working disks.

6. The method of claim 5, wherein the disk failure indicator is identified via quantile distribution graphs of the plurality of diagnostic parameters of the known failed disks and working disks.

7. The method of claim 1, wherein the storage system is a deduplicated backup storage system.

8. A non-transitory machine-readable medium having instructions stored therein, which when executed by a processor, cause the processor to perform a method for predicting disk failures in a redundant array of independent disks (RAID) environment, the method comprising:
receiving first values of a predetermined diagnostic parameter collected from a set of known failed disks of a storage system;
generating a quantile distribution graph of the first values against percentiles of a number of known failed disks;
in response to second values of the predetermined diagnostic parameter collected from a set of target disks, applying each of the second values to the quantile distribution graph to determine a corresponding percentile for each of the target disks, which represents a failure probability of a corresponding one of the target disks; and
calculating a failure probability of two or more of the target disks based on the determined percentiles of the target disks.

9. The non-transitory machine-readable medium of claim 8, wherein the predetermined diagnostic parameter is one of a reallocated sector count, a medium error, a timeout, a pending sector count, an uncorrectable sector count, a connection error, and a data error.

10. The non-transitory machine-readable medium of claim 8, wherein the first values are presented in the quantile distribution graph at a 10 percentile interval of the number of known failed disks.

11. The non-transitory machine-readable medium of claim 8, wherein applying each of the second values to the quantile distribution graph comprises:
determining an interval between a lower percentile and an upper percentile in which a particular second value of the predetermined diagnostic parameter falls on the quantile distribution graph; and
assigning the upper percentile, as an individual failure probability, to a disk associated with that particular second value of the predetermined diagnostic parameter.

12. The non-transitory machine-readable medium of claim 8, wherein the method further comprising selecting the predetermined diagnostic parameter as a disk failure indicator that can most successfully indicate a failed disk based on a plurality of diagnostic parameters collected from a set of known failed disks and working disks.

13. The non-transitory machine-readable medium of claim 12, wherein the disk failure indicator is identified via quantile distribution graphs of the plurality of diagnostic parameters of the known failed disks and working disks.

14. The non-transitory machine-readable medium of claim 8, wherein the storage system is a deduplicated backup storage system.

15. A data processing system for predicting disk failures in a redundant array of independent disks (RAID) environment, the system comprising:
- a processor; and
- a memory coupled to the processor for storing instructions, which when executed from the memory, cause the processor to perform a method, the method including
  - receiving first values of a predetermined diagnostic parameter collected from a set of known failed disks of a storage system,
  - generating a quantile distribution graph of the first values against percentiles of a number of known failed disks,
  - in response to second values of the predetermined diagnostic parameter collected from a set of target disks, applying each of the second values to the quantile distribution graph to determine a corresponding percentile for each of the target disks, which represents a failure probability of a corresponding one of the target disks, and
  - calculating a failure probability of two or more of the target disks based on the determined percentiles of the target disks.

16. The system of claim 15, wherein the predetermined diagnostic parameter is one of a reallocated sector count, a medium error, a timeout, a pending sector count, an uncorrectable sector count, a connection error, and a data error.

17. The system of claim 15, wherein the first values are presented in the quantile distribution graph at a 10 percentile interval of the number of known failed disks.

18. The system of claim 15, wherein applying each of the second values to the quantile distribution graph comprises:
- determining an interval between a lower percentile and an upper percentile in which a particular second value of the predetermined diagnostic parameter falls on the quantile distribution graph; and
- assigning the upper percentile, as an individual failure probability, to a disk associated with that particular second value of the predetermined diagnostic parameter.

19. The system of claim 15, wherein the method further comprising selecting the predetermined diagnostic parameter as a disk failure indicator that can most successfully indicate a failed disk based on a plurality of diagnostic parameters collected from a set of known failed disks and working disks.

20. The system of claim 19, wherein the disk failure indicator is identified via quantile distribution graphs of the plurality of diagnostic parameters of the known failed disks and working disks.

21. The system of claim 15, wherein the storage system is a deduplicated backup storage system.

* * * * *